(12) United States Patent
Kaino et al.

(10) Patent No.: US 11,367,257 B2
(45) Date of Patent: Jun. 21, 2022

(54) INFORMATION PROCESSING APPARATUS, INFORMATION PROCESSING METHOD, AND STORAGE MEDIUM

(71) Applicant: SONY CORPORATION, Tokyo (JP)

(72) Inventors: Akihiko Kaino, Kanagawa (JP); Shunichi Homma, Tokyo (JP); Masaki Fukuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 284 days.

(21) Appl. No.: 16/097,731

(22) PCT Filed: Feb. 27, 2017

(86) PCT No.: PCT/JP2017/007455
§ 371 (c)(1),
(2) Date: Oct. 30, 2018

(87) PCT Pub. No.: WO2017/203774
PCT Pub. Date: Nov. 30, 2017

(65) Prior Publication Data
US 2020/0394841 A1 Dec. 17, 2020

(30) Foreign Application Priority Data
May 26, 2016 (JP) .............................. JP2016-105244

(51) Int. Cl.
*G06T 19/00* (2011.01)
*G06T 7/50* (2017.01)

(52) U.S. Cl.
CPC .............. *G06T 19/006* (2013.01); *G06T 7/50* (2017.01); *G06T 2200/24* (2013.01)

(58) Field of Classification Search
CPC ...... G06T 19/006; G06T 7/50; G06T 2200/24
USPC ........................................................ 345/419
See application file for complete search history.

(56) References Cited

U.S. PATENT DOCUMENTS

| | | | | |
|---|---|---|---|---|
| 2005/0270289 A1* | 12/2005 | Momose | ............... | G06T 11/203 345/443 |
| 2009/0135176 A1* | 5/2009 | Snoddy | ................... | G06Q 30/02 345/419 |
| 2012/0020566 A1* | 1/2012 | Yamanouchi | ........... | G06F 3/033 382/187 |
| 2012/0194554 A1* | 8/2012 | Kaino | .............. | G08B 13/19621 345/633 |
| 2014/0098094 A1* | 4/2014 | Neumann | ............... | G06T 17/10 345/420 |
| 2014/0247260 A1* | 9/2014 | Ghoneima | .............. | G06T 19/00 345/419 |
| 2016/0086336 A1* | 3/2016 | Lin | ........................... | G06T 7/74 348/50 |

* cited by examiner

*Primary Examiner* — Hai Tao Sun
(74) *Attorney, Agent, or Firm* — Paratus Law Group, PLLC

(57) ABSTRACT

There is provided an information processing apparatus to bring a three-dimensional model generated in accordance with observation information, closer to a real object. The information processing apparatus includes: a control section configured to allocate, to a second three-dimensional model being at least a partial three-dimensional model included in a first three-dimensional model, a definite shaped model having a predetermined shape corresponding to a shape of the second three-dimensional model.

20 Claims, 22 Drawing Sheets

FIG. 11
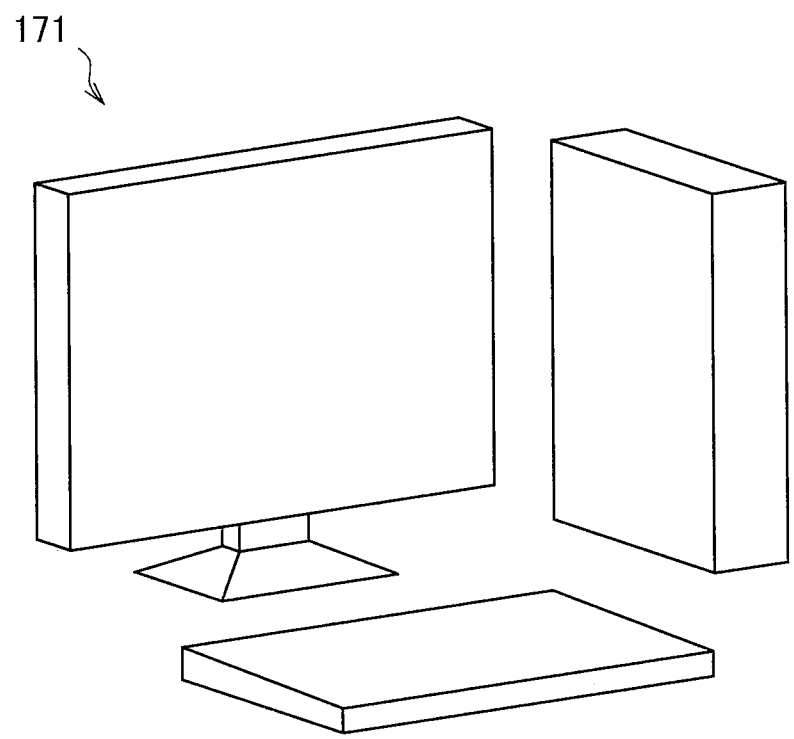
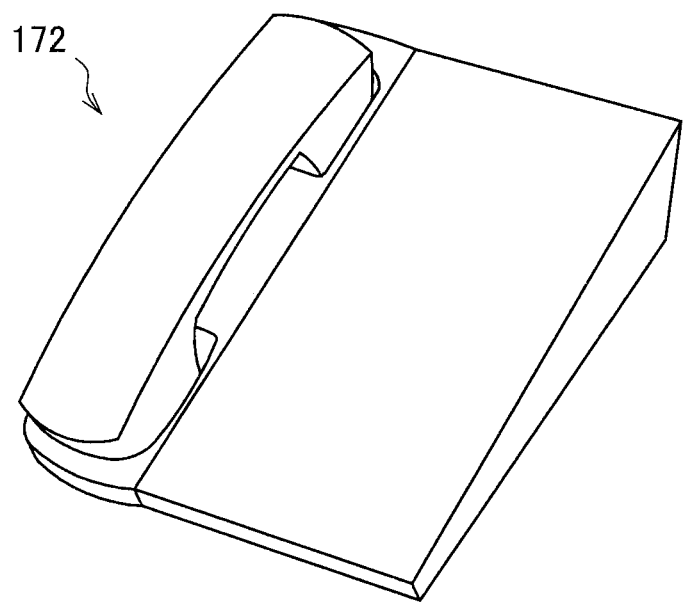

FIG. 18
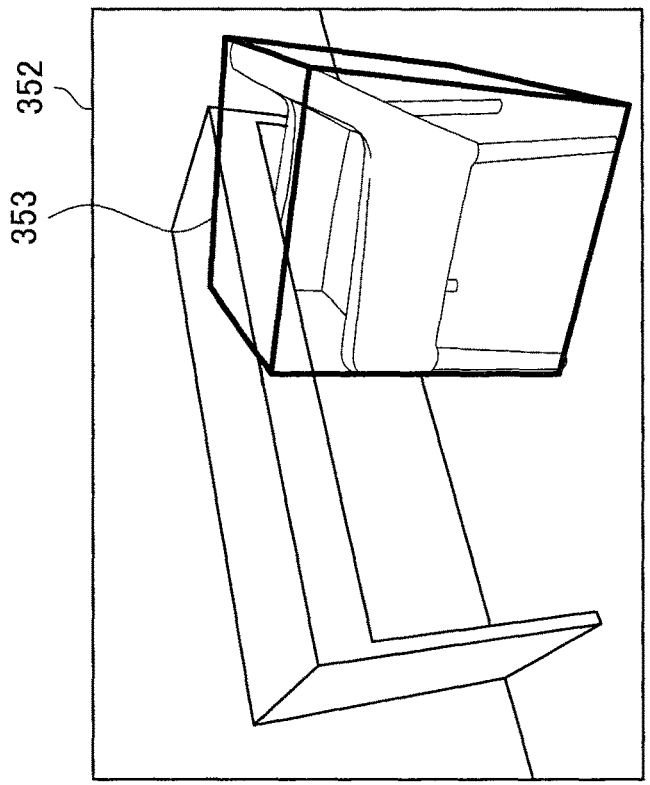
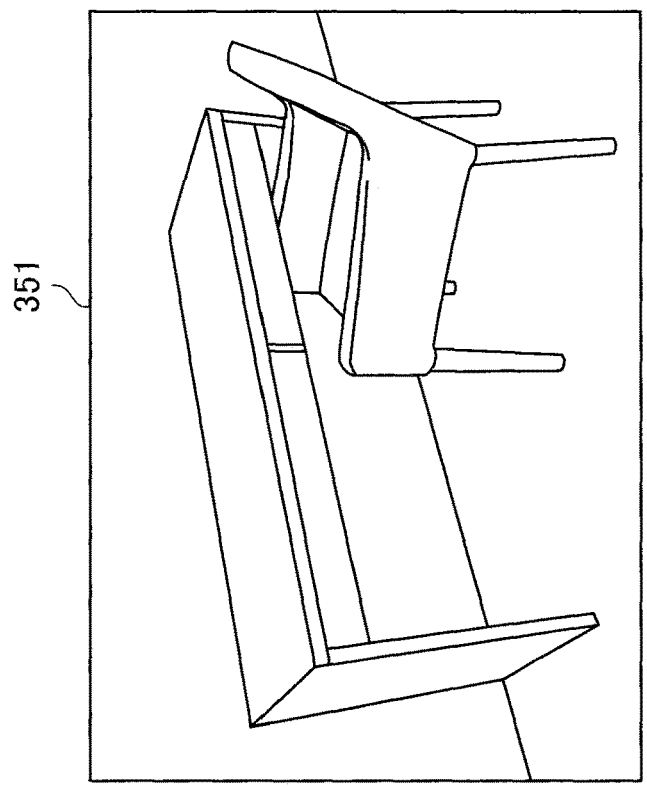

FIG. 19
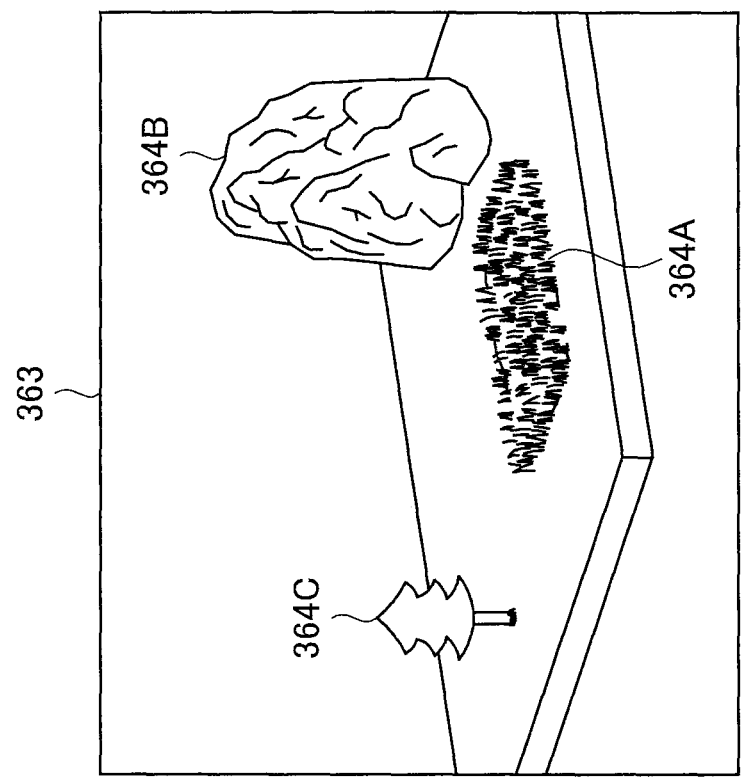
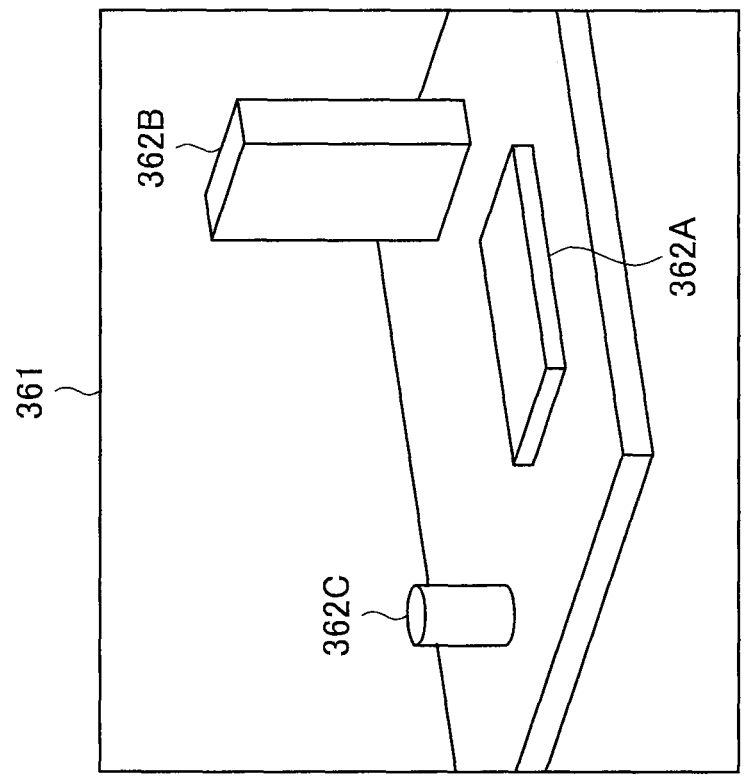

INFORMATION PROCESSING APPARATUS, INFORMATION PROCESSING METHOD, AND STORAGE MEDIUM

CROSS REFERENCE TO PRIOR APPLICATION

This application is a National Stage Patent Application of PCT International Patent Application No. PCT/JP2017/007455 (filed on Feb. 27, 2017) under 35 U.S.C. § 371, which claims priority to Japanese Patent Application No. 2016-105244 (filed on May 26, 2016), which are all hereby incorporated by reference in their entirety.

TECHNICAL FIELD

The present disclosure relates to an information processing apparatus, an information processing method, and a storage medium.

BACKGROUND ART

In recent years, a technology of observing a real world using a sensor of a camera or the like, and generating a three-dimensional model of a real object has attracted attention. The generated three-dimensional model can be used in a variety of applications such as Computer Graphic (CG) or a 3D printer. For meeting requests from such applications, a technology for generating a highly-accurate three-dimensional model has been developed.

For example, Patent Literature 1 described below discloses a technology of estimating shooting position and direction of a camera from images to be combined, for naturally combining stereoscopic images.

CITATION LIST

Patent Literature

Patent Literature 1: JP H10-304244A

DISCLOSURE OF INVENTION

Technical Problem

Nevertheless, in a typical three-dimensional model generation technology, a three-dimensional model has been merely generated in accordance with observation information, and an error included in the observation information has also been reflected in the generated three-dimensional model. Thus, in some cases, the generated three-dimensional model becomes the one that is different from a real object. In view of the foregoing, a technology of bringing a three-dimensional model closer to a real object is desirably provided.

Solution to Problem

According to the present disclosure, there is provided an information processing apparatus including: a control section configured to allocate, to a second three-dimensional model being at least a partial three-dimensional model included in a first three-dimensional model, a definite shaped model having a predetermined shape corresponding to a shape of the second three-dimensional model.

In addition, according to the present disclosure, there is provided an information processing method including: allocating, by a processor, to a second three-dimensional model being at least a partial three-dimensional model included in a first three-dimensional model, a definite shaped model having a predetermined shape corresponding to a shape of the second three-dimensional model.

In addition, according to the present disclosure, there is provided a storage medium having a program stored therein, the program causing a computer to function as: a control section configured to allocate, to a second three-dimensional model being at least a partial three-dimensional model included in a first three-dimensional model, a definite shaped model having a predetermined shape corresponding to a shape of the second three-dimensional model.

Advantageous Effects of Invention

As described above, according to the present disclosure, a technology of bringing a three-dimensional model generated in accordance with observation information, closer to a real object is provided. Note that the effects described above are not necessarily imitative. With or in the place of the above effects, there may be achieved any one of the effects described in this specification or other effects that may be grasped from this specification.

BRIEF DESCRIPTION OF DRAWINGS

FIG. 11 is a diagram illustrating an example of a definite shaped model according to the present embodiment.

FIG. 18 is a diagram for describing an example of a UI according to the present embodiment.

FIG. 19 is a diagram for describing an example of a UI according to the present embodiment.

MODE(S) FOR CARRYING OUT THE INVENTION

Figure 1:
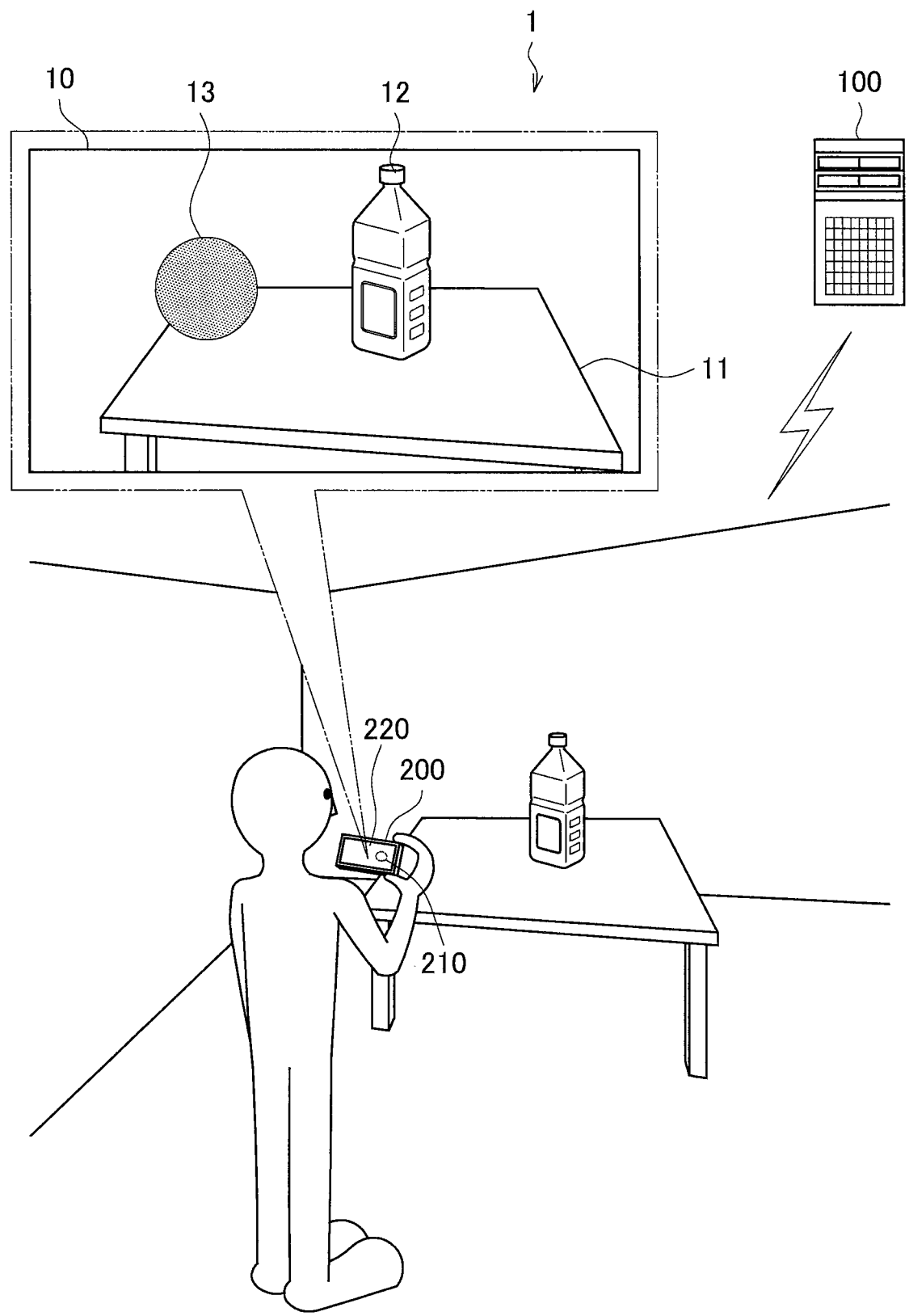
FIG. 1 is a diagram illustrating an example of a schematic configuration of a system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Introduction
  1.1. Overview of System
  1.2. Related Technology
2. Configuration Example
  2.1. Configuration Example of Information Processing Apparatus
  2.2. Configuration Example of Terminal Apparatus
3. Technical Feature
  3.1. Overview of Proposal Technology
  3.2. Registration Processing of Definite Shaped Model
  3.3. Generation Processing of Three-Dimensional Model
  3.4. Allocation Processing of Definite Shaped Model
  3.5. Output Control Processing
  3.6. Flow of Processing
4. Application Example
5. Hardware Configuration Example
6. Conclusion

1. INTRODUCTION

<1.1. Overview of System>

First of all, an overview of a system according to an embodiment of the present disclosure will be described with reference to FIG. 1.

FIG. 1 is a diagram illustrating an example of a schematic configuration of a system according to the present embodiment. As illustrated in FIG. 1, a system 1 according to the present embodiment includes an information processing apparatus 100 and a terminal apparatus 200. In the example illustrated in FIG. 1, the information processing apparatus 100 is a server, and the terminal apparatus 200 is a smartphone.

As illustrated in FIG. 1, a user is viewing a display 220 while holding the smartphone 200 in his/her hand, and a camera 210 disposed on the rear side of the display 220 is directed toward a table 11. A pet bottle 12 is placed on the table 11.

As an example, the system 1 is assumed to perform display processing that is based on an Augmented Reality (AR) technology, by cooperation between the information processing apparatus 100 and the terminal apparatus 200. The AR technology is a technology of presenting, to a user, additional information with being superimposed on a real space. Information to be presented to the user in the AR technology is visualized using virtual objects in various types of forms such as text, icons, or animation. The virtual object is disposed in an AR space in accordance with a position of a real object to be associated, and an operation such as moving, colliding, or deforming can also be performed in the AR space.

In the example illustrated in FIG. 1, a UI 10 in which a virtual object 13 is superimposed on a live-view image of the table 11 and the pet bottle 12 being real objects is displayed on the display 220. Note that a captured image obtained by capturing an image of a real space in real time will also be referred to as a live-view image. For example, when the virtual object 13 collides with the table 11 and the pet bottle 12 being real objects, the virtual object 13 bounces.

As advance preparation for implementing such representation, first of all, the system 1 generates a three-dimensional model of a real space. By referring to the three-dimensional model, it becomes possible for the system 1 to display a virtual object at an appropriate position, implement occlusion representation of invalidating drawing of a virtual object to be hidden by a real object, and represent interaction such as collision between a virtual object and a real object.

For appropriately performing such representation, generation of a correct three-dimensional model is important. Nevertheless, in a typical three-dimensional model generation technology, in some cases, it has been difficult to generate a correct three-dimensional model.

<1.2. Related Technology>

Figure 2:
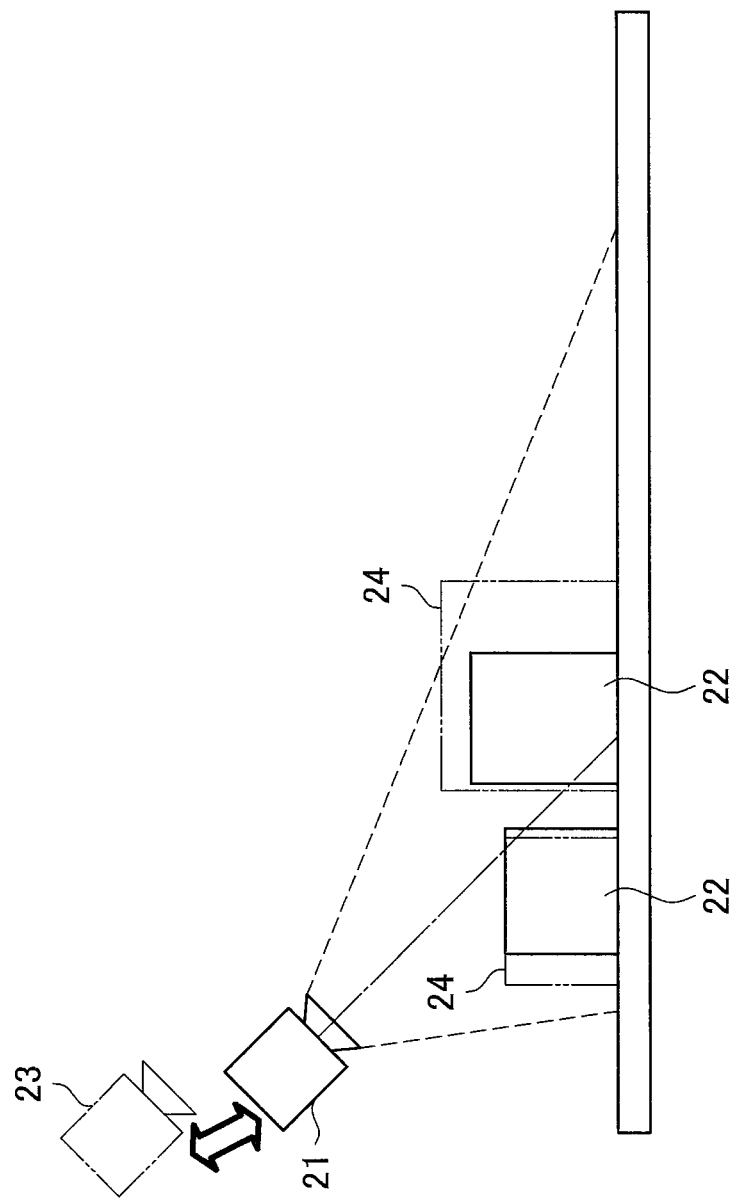
FIG. 2 is a diagram for describing a problematic point of a typical three-dimensional model generation technology.
Figure 3:
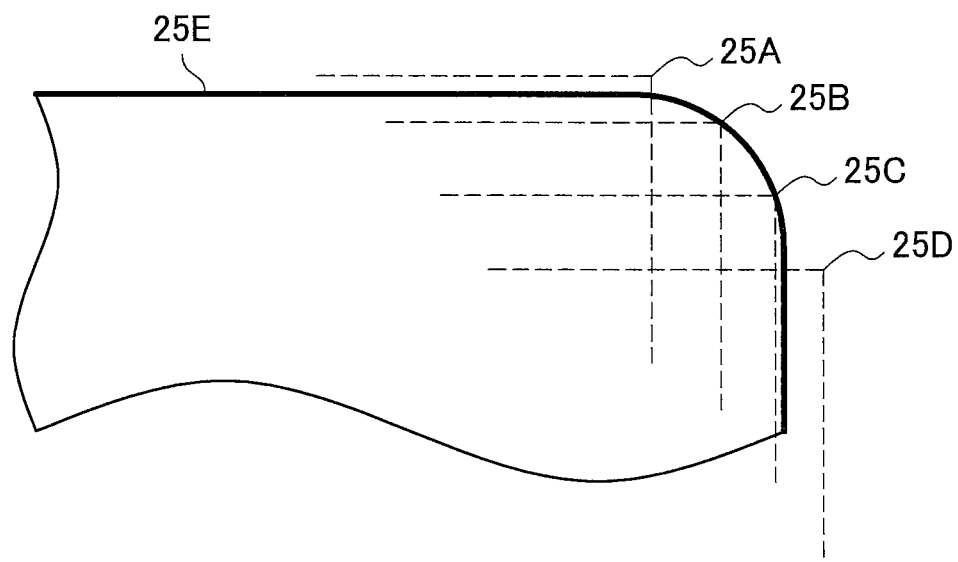
FIG. 3 is a diagram for describing a problematic point of a typical three-dimensional model generation technology.
Figure 4:
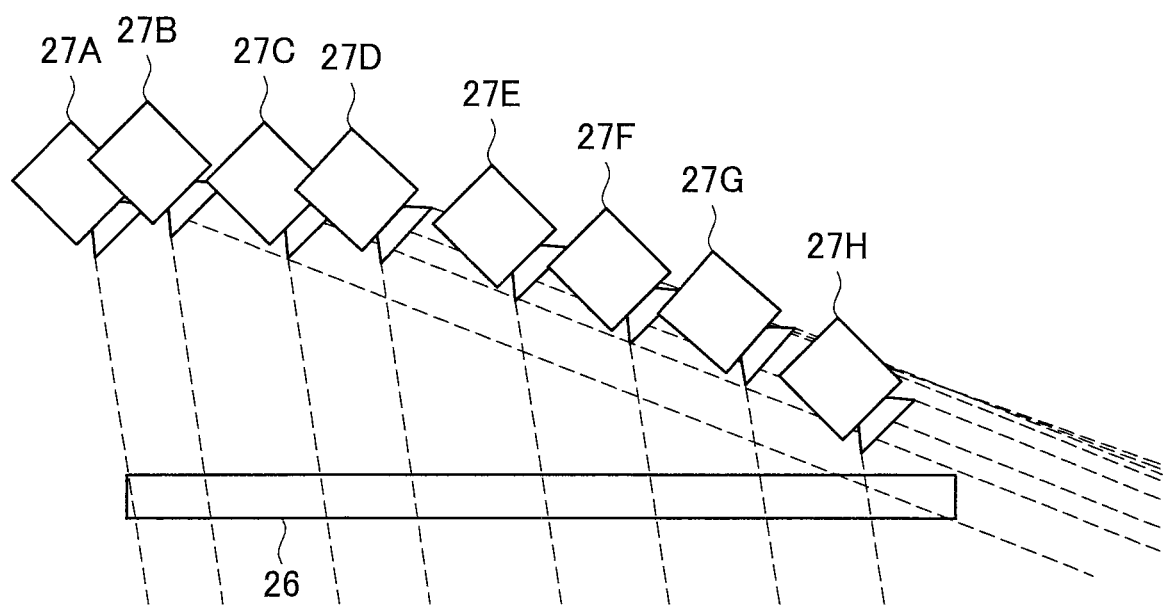
FIG. 4 is a diagram for describing a problematic point of a typical three-dimensional model generation technology.

Hereinafter, a problematic point of a typical three-dimensional model generation technology will be described with reference to FIGS. 2 to 4. FIGS. 2 to 4 are diagrams for describing a problematic point of a typical three-dimensional model generation technology.

There are a variety of technologies of performing three-dimensional modeling of a real space. As one of these technologies, there is a technology of generating a three-dimensional model by integrating a plurality of pieces of observation information obtained by a camera, a depth sensor, or the like, from various types of points of view. The observation information can include an estimation result obtained by Pose estimation, an estimation result of a position and an attitude of an observation device that is obtained by Simultaneous Localization and Mapping (SLAM), depth information of each image obtained by a depth sensor or stereo matching, or the like. A three-dimensional model to be output is represented by a point cloud including an aggregate of feature points, an aggregate of polygons (Polygon Model) including a plurality of feature points, or the like, for example. The three-dimensional model includes at least coordinate information of a feature point, and can further include information indicating a surface formed by connecting feature points, and the like.

The quality of the three-dimensional model largely depends on the estimation accuracy of a position and an attitude of an observation device, and depth information. This point will be described in detail with reference to FIG. 2. As illustrated in FIG. 2, it is assumed that a real object 22 is observed by an observation device 21. In a case where a position of the observation device 21 is erroneously estimated to be at a position 23, a generated three-dimensional model 24 becomes the one that is different from the real object 22.

Thus, for reducing an observation error, a plurality of pieces of observation information are generally used after having been subjected to averaging or the like. Nevertheless, by averaging spatial positional shifts, a model becomes less sharp at an edge portion such as an object boundary. This point will be described in detail with reference to FIG. 3. As illustrated in FIG. 3, it is assumed that three-dimensional models 25A to 25D are respectively generated by a plurality of pieces of observation information obtained by observing an edge portion of a certain object. In a case where the plurality of pieces of observation information are averaged, a three-dimensional model 25E in which the edge portion is represented to be less sharp is generated.

In addition, it is difficult to represent a flat region or the like as a stable flat surface, and a gradual curve or unevenness tends to remain. From the aspect of efficiency of processing, it is undesirable to process a stationary shape portion such as a flat surface or a curved surface, by a method similar to a nonstationary shape portion. This point will be described in detail with reference to FIG. 4, As illustrated in FIG. 4, a flat surface 26 is assumed to be observed. By integrating respective observation information pieces obtainable in a case where observation devices are at positions 27A to 27H, it is possible to model the flat surface 26. Nevertheless, unevenness attributed to an observation error can be generated, and moreover, calculation for performing modeling for each piece of observation information has been required.

In view of the foregoing, using the above circumstance as one point of observation, the system 1 according to an embodiment of the present disclosure has been eventually provided. By allocating a definite shaped model to at least a part of a generated three-dimensional model, the system 1 according to the present embodiment can bring the three-dimensional model closer to a real object.

2. CONFIGURATION EXAMPLE

Hereinafter, configuration examples of the information processing apparatus 100 and the terminal apparatus 200 will be described with reference to FIGS. 5 and 6.

<2.1. Configuration Example of Information Processing Apparatus>

Figure 5:
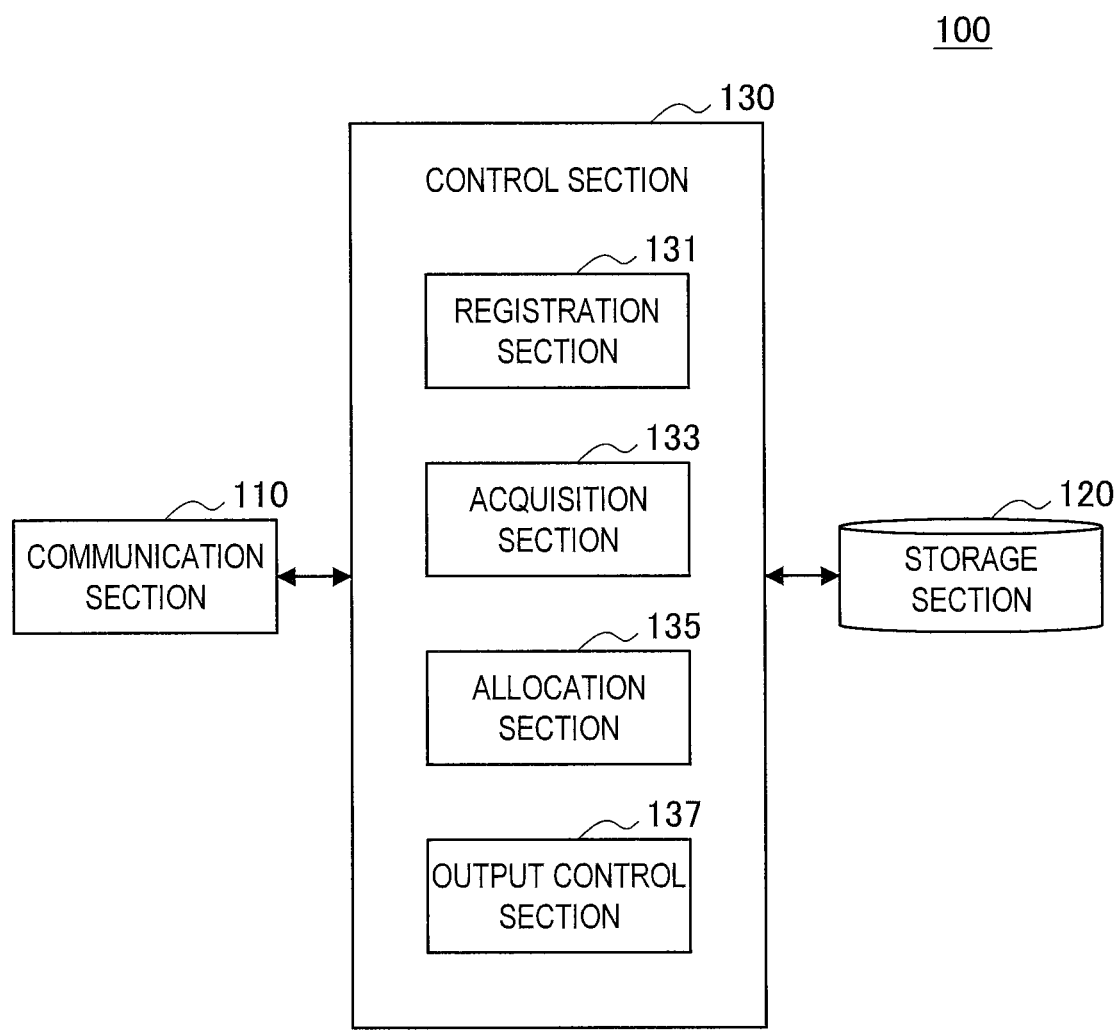
FIG. 5 is a block diagram illustrating an example of a logical configuration of an information processing apparatus according to the present embodiment.

FIG. 5 is a block diagram illustrating an example of a logical configuration of the information processing apparatus 100 according to the present embodiment. As illustrated in FIG. 5, the information processing apparatus 100 according to the present embodiment includes a communication section 110, a storage section 120, and a control section 130.

(1) Communication section 110

The communication section 110 is a communication module for performing transmission and reception of data between itself and the terminal apparatus 200 in a wired/wireless manner. The communication section 110 can perform communication conforming to an arbitrary communication method such as a Local Area Network (LAN), a wireless LAN, (registered trademark). Bluetooth (registered trademark), or infrared communication, for example.

(2) Storage section 120

The storage section 120 temporarily or permanently stores programs and various types of data for operations of the information processing apparatus 100.

(3) Control section 130

The control section 130 corresponds to a Central Processing Unit (CPU), a Digital Signal Processor (DSP), or the like, and performs processing for providing various types of functions of the information processing apparatus 100. As illustrated in FIG. 5, the control section 130 includes a registration section 131, an acquisition section 133, an allocation section 135, and an output control section 137.

Note that the control section 130 can further include structural elements other than these structural elements. In other words, the control section 130 can also perform operations other than operations of these structural elements. The operations of these structural elements will be described in detail later.

<2.2. Configuration Example of Terminal Apparatus>

Figure 6:
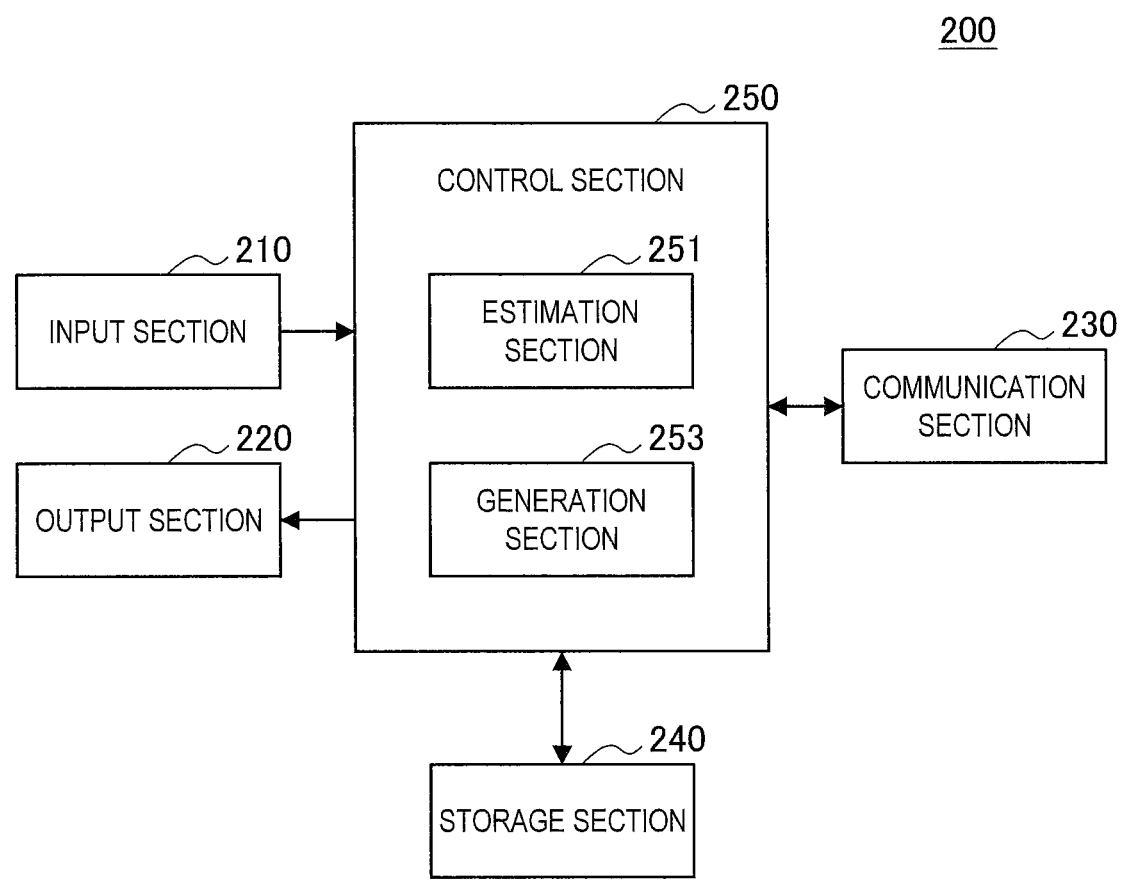
FIG. 6 is a block diagram illustrating an example of a logical configuration of a terminal apparatus according to the present embodiment.

FIG. 6 is a block diagram illustrating an example of a logical configuration of the terminal apparatus 200 according to the present embodiment. As illustrated in FIG. 6, the terminal apparatus 200 according to the present embodiment includes an input section 210, an output section 220, a communication section 230, a storage section 240, and a control section 250.

(1) Input section 210

The input section 210 receives an input of information. For example, the input section 210 receives an input of information from the user. Additionally, the input section 210 includes a sensor that detects information regarding a three-dimensional shape of a real space, such as an image sensor and a depth sensor. In addition, the input section 210 includes a sensor that detects information regarding an attitude of the terminal apparatus 200, such as an acceleration sensor, a gyro sensor, and a geomagnetic sensor. The input section 210 outputs the input information to the output section 220.

(2) Output section 220

The output section 220 performs an output of information. For example, the output section 220 outputs information using an image, a sound, vibration, and/or the like. The output section 220 outputs information on the basis of control performed by the control section 250.

(3) Communication section 230

The communication section 230 is a communication module for performing transmission and reception of data between itself and the information processing apparatus 100 in a wired/wireless manner. The communication section 230 can perform communication conforming to an arbitrary communication method such as a LAN, a wireless LAN, Wi-Fi, Bluetooth, or infrared communication, for example.

(4) Storage section 240

The storage section 240 temporarily or permanently stores programs and various types of data for operations of the terminal apparatus 200.

(5) Control section 250

The control section 250 corresponds to a CPU, a DSP, or the like, and performs processing for providing various types of functions of the terminal apparatus 200. As illustrated in FIG. 6, the control section 250 includes an estimation section 251 and a generation section 253. Note that the control section 250 can further include structural elements other than these structural elements. In other words, the control section 250 can also perform operations other than operations of these structural elements. The operations of these structural elements will be described in detail later.

3. TECHNICAL FEATURE

<3.1 Overview of Proposal Technology>

Figure 7:
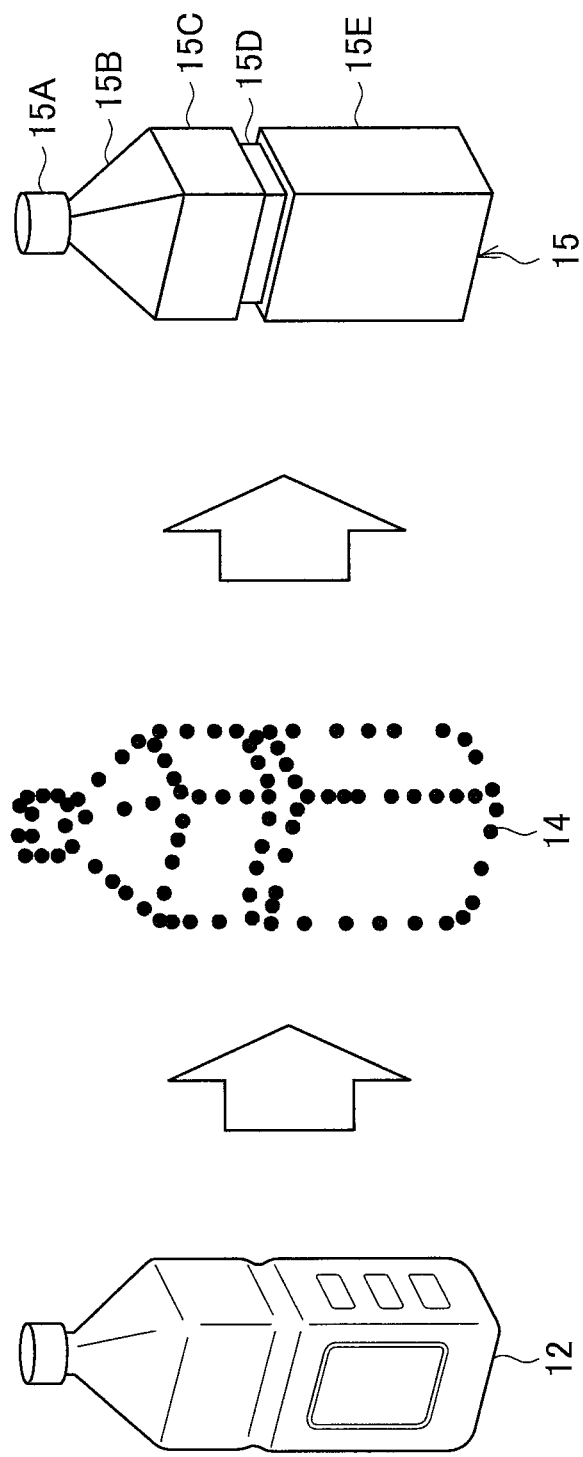
FIG. 7 is a diagram for describing an overview of a proposal technology according to the present embodiment.
Figure 8:
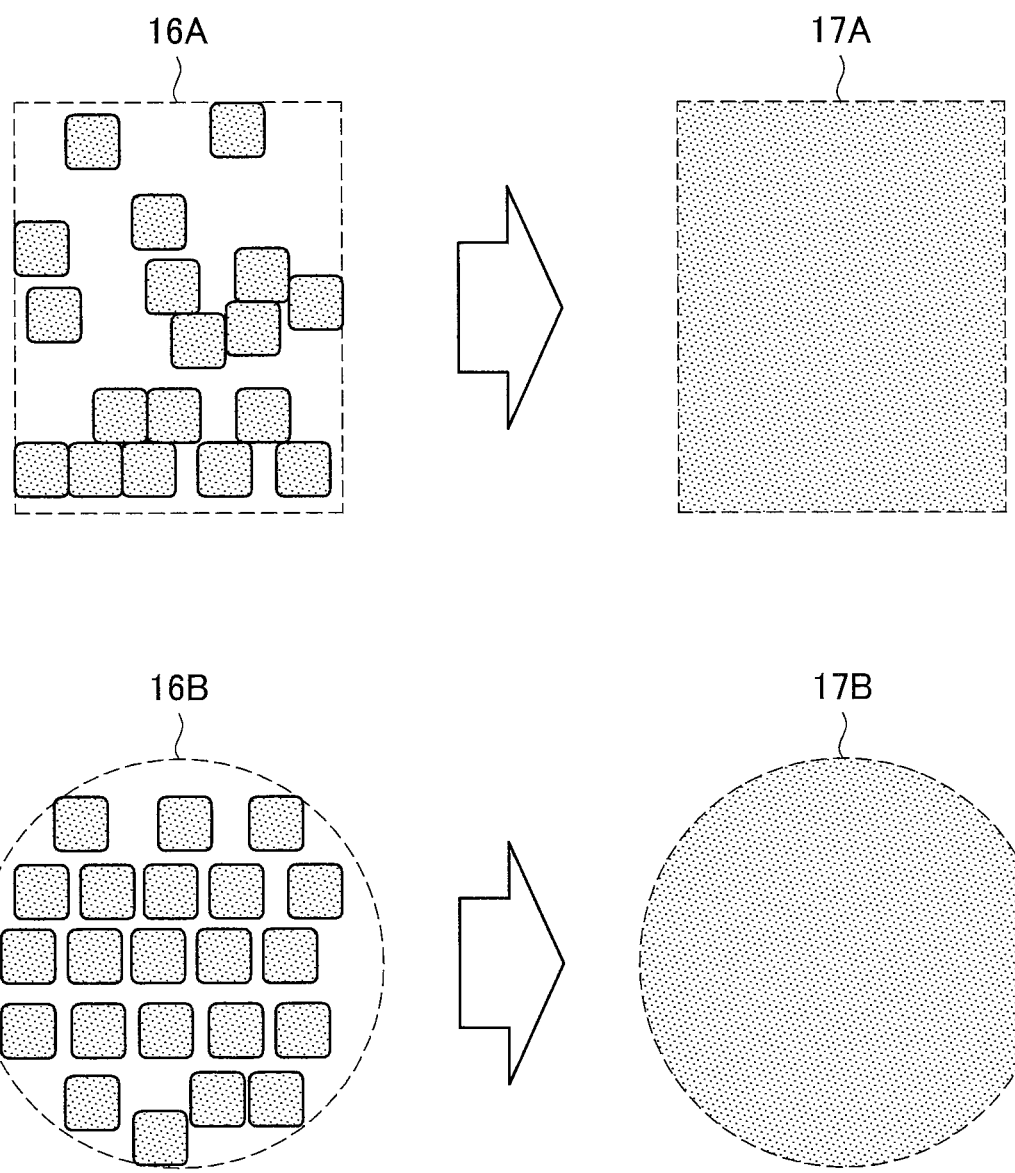
FIG. 8 is a diagram for describing an overview of a proposal technology according to the present embodiment.

First of all, an overview of a proposal technology according to the present embodiment will be described with reference to FIGS. 7 and 8. FIGS. 7 and 8 are diagrams for describing an overview of a proposal technology according to the present embodiment.

As illustrated in FIG. 7, first of all, the system 1 generates a three-dimensional model 14 from the pet bottle 12 being a real object. An arbitrary generation method can be used, and for example, the above-described typical technology for three-dimensional modeling can be adopted. As an example, the three-dimensional model 14 is assumed to be a point cloud. Then, the system 1 generates a three-dimensional model 15 from the generated three-dimensional model 14 (i.e. updates the generated three-dimensional model 14).

For example, by allocating a similar definite shaped model prepared in advance, to the generated three-dimensional model 14, the system 1 generates the three-dimensional model 15, The definite shaped model is a three-dimensional model having a predefined shape. Allocation of a definite shaped model will be described in detail with reference to FIG. 8. As illustrated in FIG. 8, point clouds 16A and 16B are assumed to be generated from observation information. For example, the system 1 allocates a similar flat surface model 17A to the point cloud 16A. In addition, the system 1 allocates a similar spherical model 17B to the point cloud 16B. In the example illustrated in FIG. 7, by allocating a cylindrical model 15A, a square pyramid model 15B, and cuboid models 15C, 15D, and 15E to the generated point cloud 14, the system 1 generates the three-dimensional model 15. By such allocation, a three-dimensional model including an aggregate of feature points having three-dimensional information pieces is represented by one definite shaped model, and an information amount of the three-dimensional model can be degenerated. Also in a case where the three-dimensional model is generated not by a point cloud but by polygons, by such allocation, the number of polygons can be degenerated. As described above, by allocating a definite shaped model, it becomes possible for the system 1 to efficiently represent a three-dimensional model including an enormous information amount, by degenerating the information amount.

According to the proposal technology, it becomes possible to generate, for a real object including an edge portion and a flat region, a three-dimensional model having a smooth surface, while maintaining a three-dimensional geometric structure. Specifically, by allocation of a definite shaped model, it is possible to reduce a gradual curve or unevenness that is attributed to an observation error, for example. In other words, it becomes possible to bring a three-dimensional model closer to a real object. Furthermore, it becomes possible for the system 1 to appropriately represent interaction between a real object and a virtual object, for example.

In addition, according to the proposal technology, by allocation of a definite shaped model, because a stationary shape portion such as a flat surface or a curved surface can be represented by the definite shaped model, processing efficiency can be enhanced.

In addition, the proposal technology can also perform prediction of a three-dimensional model for an unobserved region. A prediction result of a three-dimensional model may be used for reliability determination of observation information, or may be directly output.

Note that, here, the description will be given using the AR technology as an example, but the present technology is not limited to this example. For example, the present technology can be similarly applied in a technology of using a three-dimensional model, such as a Virtual Reality (VR) technology or a Mixed Reality (MR) technology.

An overview of the proposal technology has been described above.

For implementing the proposal technology, the system 1 according to the present embodiment performs processing broadly classified into four types, that is to say, performs registration processing of a definite shaped model, generation processing of a three-dimensional model, allocation processing of a definite shaped model, and output control processing. Hereinafter, these four types of processing will be described with reference to FIG. 9.

Figure 9:
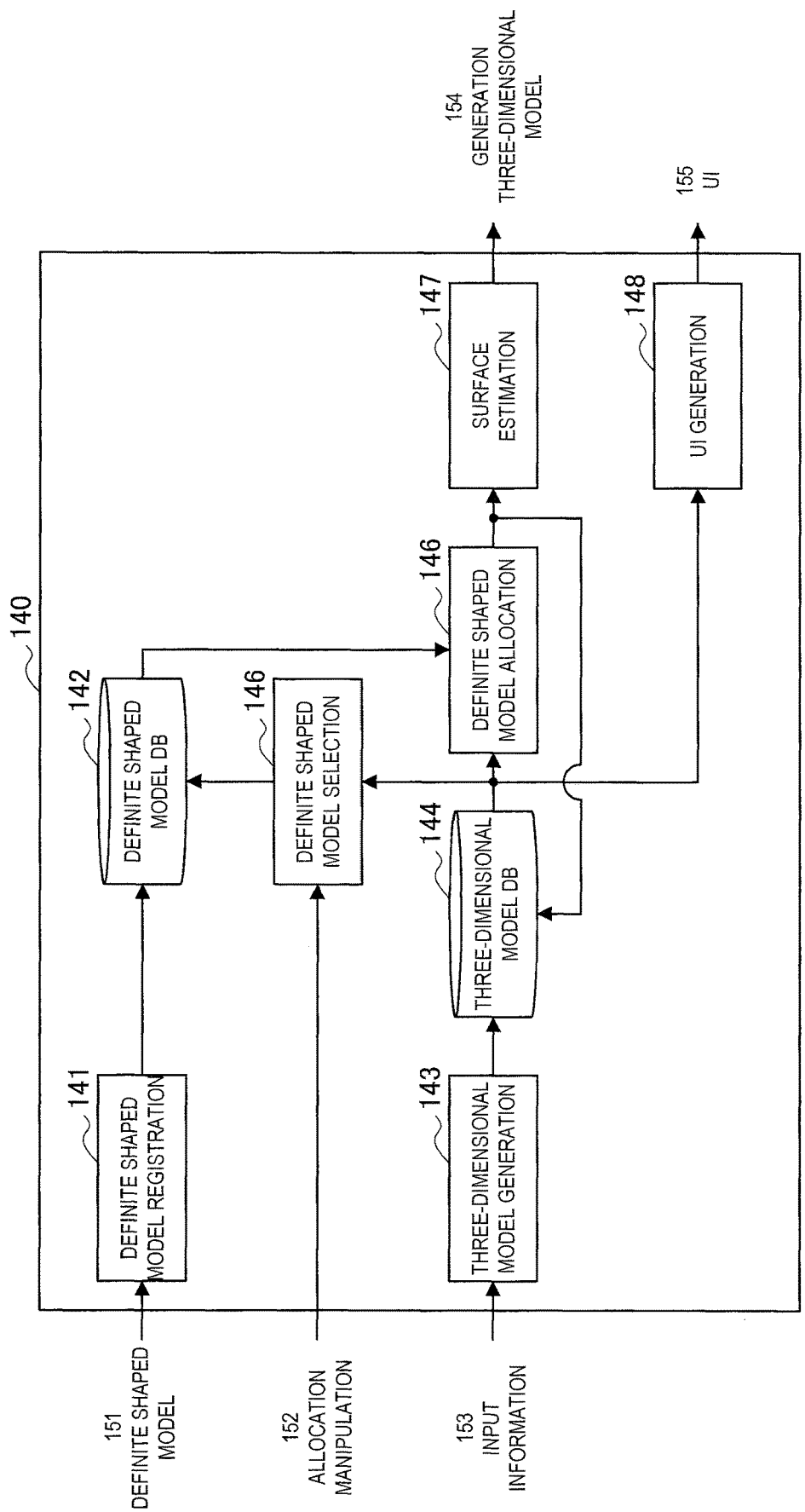
FIG. 9 is a diagram for describing an entire picture of processing executed in the system according to the present embodiment.

FIG. 9 is a diagram for describing an entire picture of processing executed in the system 1 according to the present embodiment. A processing block 140 indicates processing executed by the system 1. An input to the system 1 can be performed by the user manipulating the terminal apparatus 200, or by communication between an external device on the internet and the information processing apparatus 100, for example. In addition, an output from the system 1 can be performed by an output from the terminal apparatus 200, or by information transmission from the information processing apparatus 100.

<3.2. Registration Processing of Definite Shaped Model>

The system 1 (e.g. the registration section 131) registers (reference numeral 141) an input definite shaped model (reference numeral 151). Then, the system 1 accumulates (reference numeral 142) a plurality of registered definite shaped models in a definite shaped model DB (e.g. the storage section 120).

The definite shaped model is a three-dimensional model having a predefined shape. Specifically, the definite shaped model includes relative coordinates of a plurality of vertices, and information indicating a surface including the plurality of vertices. Furthermore, the definite shaped model may include, as additional information, at least any of information indicating texture of the surface, information indicating material, information indicating a normal line of the surface, or information indicating a grounding surface or a direction of gravitational force. By these pieces of additional information, it becomes possible for the system 1 to generate a three-dimensional model conforming more to a real space. The definite shaped model may be a polygon. Various types of shapes that the definite shaped model can have can be considered. An example thereof is illustrated in FIG. 10.

Figure 10:
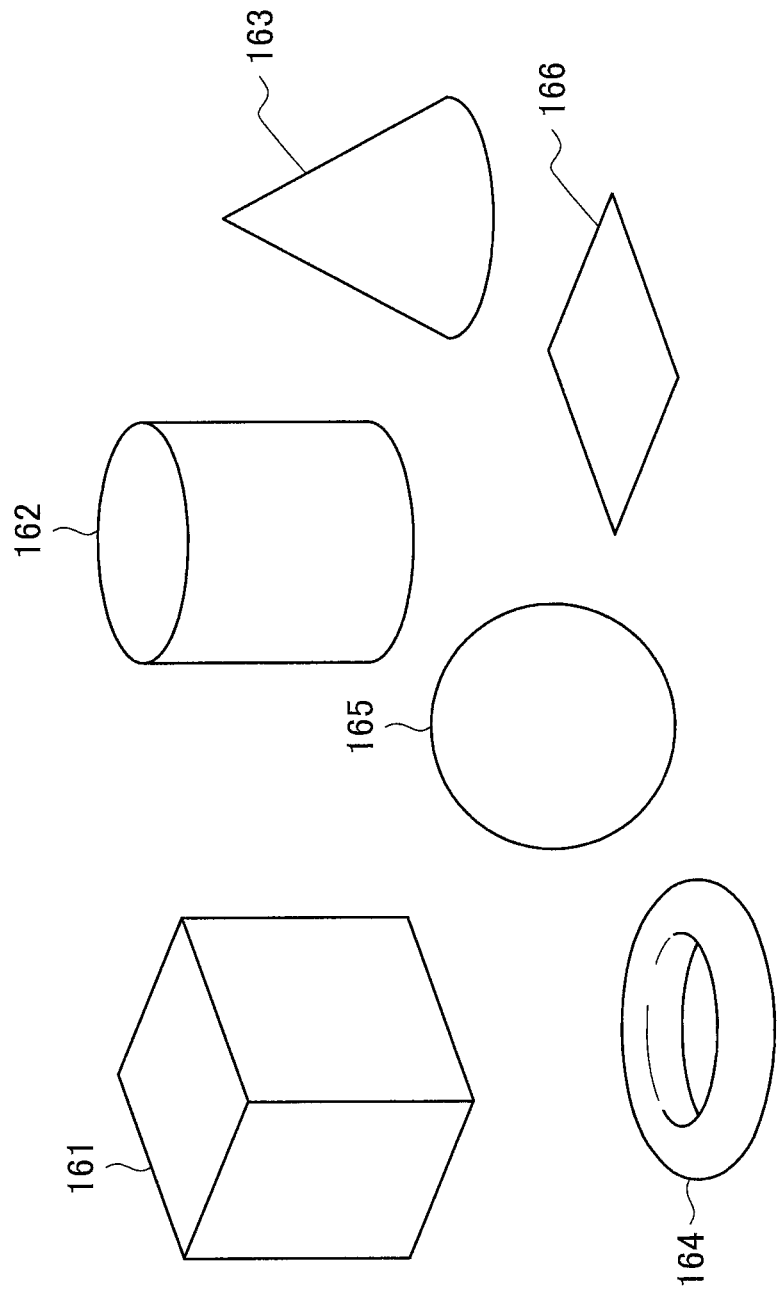
FIG. 10 is a diagram illustrating an example of a definite shaped model according to the present embodiment.

FIG. 10 is a diagram illustrating an example of a definite shaped model according to the present embodiment. As illustrated in FIG. 10, as definite shaped models, a variety of shapes such as a cuboid 161, a cylinder 162, a circular cone 163, a doughnut shape 164, a sphere 165, and a flat surface 166 can be registered.

Aside from simple shapes as illustrated in FIG. 10, the definite shaped model can have a complicated shape. For example, the system 1 can register a definite shaped model corresponding to a modeling target. For example, if a modeling target is indoor, the system 1 registers a definite shaped model having a shape of a real object having a high possibility of existing indoors. An example thereof is illustrated in FIG. 11.

FIG. 11 is a diagram illustrating an example of a definite shaped model according to the present embodiment. As illustrated in FIG. 11, as definite shaped models, a variety of shapes such as a computer 171 and a telephone device 172 can be registered. Additionally, for example, if a modeling target is outdoor, a variety of shapes such as a vehicle, a nameboard, and a signboard can be registered as definite shaped models.

The system 1 may register different definite shaped models in accordance with the accuracy of modeling.

The registration processing of a definite shaped model has been described above. The registration processing of a definite shaped model is processing to be performed in advance.

After the registration processing of a definite shaped model, the user performs observation (e.g. acquisition of a captured image and depth information) while directing the terminal apparatus 200 toward an unobserved region of a real space. Concurrently with the observation or after the observation, the system 1 performs the generation processing of a three-dimensional model, the allocation processing of a definite shaped model, and the output control processing, which will be described below.

<3.3. Generation Processing of Three-Dimensional Model>

The system 1 (e.g. the estimation section 251 and the generation section 253) generates a three-dimensional model (reference numeral 143) by estimating a position and an attitude of the terminal apparatus 200, and a relationship (e.g. depth) between the terminal apparatus 200 and a surrounding real object, on the basis of input information (reference numeral 153). The input information includes, for example, a captured image and/or depth information observed by the terminal apparatus 200. The generation of a three-dimensional model is typically performed in the terminal apparatus 200. The information processing apparatus 100 (e.g. the acquisition section 133) acquires a three-dimensional model generated by the terminal apparatus 200, and accumulates the acquired three-dimensional model into a three-dimensional model DB (e.g. the storage section 120) (reference numeral 144). The accumulation is performed in a case where an unobserved region of a real space is newly observed by the terminal apparatus 200, for example. In other words, the accumulation means expansion (e.g. integration) of a generated three-dimensional model. Hereinafter, a three-dimensional model accumulated in the three-dimensional model DB will also be referred to as a generation three-dimensional model.

The system 1 can generate a three-dimensional model using a variety of technologies. For example, the SLAM that can simultaneously estimate a position and an attitude of a camera, and a position of a feature point included in an image of the camera can be adopted. In the case of adopting the SLAM, the system 1 can simultaneously acquire an environmental map (corresponding to a three-dimensional model) of a surrounding real space of the terminal apparatus 200, and attitude information indicating a position and an attitude of the terminal apparatus 200 (in particular, an image sensor).

A basic principle of the SLAM technology that uses a monocular camera is described in "Andrew J. Davison, "Real-Time Simultaneous Localization and Mapping with a Single Camera", Proceedings of the 9th IEEE International Conference on Computer Vision Volume 2, 2003, pp. 1403-1410". Note that the SLAM technology that visually estimates a position using a camera image is also especially referred to as a visual SLAM (VSLAM). In the SLAM technology, a position and an attitude of a camera are estimated using the environmental map and the camera image. In the case of using the SLAM technology, for example, by performing matching between the environmental map and a three-dimensional position of a feature point belonging to an object, the system 1 can highly-accurately position a three-dimensional model forming the shape of the object, with respect to a real object.

Additionally, the system 1 may generate a three-dimensional model by Pose estimation that is based on a captured image, and depth estimation that is based on a captured image, or by reading input depth information.

In addition, the system 1 may acquire attitude information of the terminal apparatus 200 by use of a known marker, or by an attitude estimation technology such as Iterative Closest Point (ICP) and Photo Consistency optimization. In addition, the system 1 may acquire the attitude information on the basis of information detected by an acceleration sensor, an angular speed (gyro) sensor, or a geomagnetic sensor.

Note that a generated three-dimensional model may be a point cloud or may be a polygon.

<3.4. Allocation Processing of Definite Shaped Model>

The system 1 (e.g. the allocation section 135) allocates, to at least a partial three-dimensional model (i.e. second three-dimensional model) included in a generation three-dimensional model (i.e. first three-dimensional model), a definite shaped model having a predetermined shape corresponding to the shape of the partial three-dimensional model. For example, the system 1 sequentially allocates definite shaped models to unallocated three-dimensional models of the generation three-dimensional model. Here, the allocation means replacement, and for example, the system 1 deletes feature points encompassed by the allocated definite shaped models. By allocating a definite shaped model, it becomes possible for the system 1 to efficiently represent a generation three-dimensional model including an enormous information amount, by degenerating the information amount.

Specifically, the system 1 selects, from among a plurality of definite shaped models stored in the definite shaped model DB, a definite shaped model to be allocated (reference numeral 145). Then, by allocating the selected definite shaped model to the generation three-dimensional model (reference numeral 146), and feeding back an allocation result to the three-dimensional model DB, the system 1 updates the generation three-dimensional model accumulated in the three-dimensional model DB.

The selection of a definite shaped model to be allocated can be performed in accordance with a variety of criteria. For example, the system 1 may perform selection in accordance with a degree of similarity between an allocation target partial three-dimensional model and a definite shaped model. It thereby becomes possible to allocate a definite shaped model confirming to the shape of a real object. At the time of evaluation of a degree of similarity and allocation, a definite shaped model is arbitrarily expanded, reduced, and rotated.

A degree of similarity can be evaluated by a variety of methods. For example, a degree of similarity may be evaluated by a distance between a feature point included in a three-dimensional model and a vertex included in a definite shaped model. For example, a sum of the above distances is represented by the following formula.

[Math. 1]

$$D_i = \frac{1}{N} \sum_{j}^{N} d_{i,j} \quad (1)$$

Here "i" denotes an index of a definite shaped model, "j" denotes an index of a combination of a feature point included in a three-dimensional model, and a vertex included in a definite shaped model, and "N" denotes the number of combinations. For example, the system 1 selects a similar definite shaped model by searching for "i" that minimizes "$D_i$".

In addition, a normal line may be considered in the evaluation of a degree of similarity. For example, a degree of similarity may be evaluated by a degree of coincidence of normal lines between a feature point included in a three-dimensional model, and a vertex included in a definite shaped model. For example, a degree of coincidence of normal lines is represented by the following formula.

[Math. 2]

$$A_i = \frac{1}{N}\sum_{j}^{N} a_{i,j} \quad (2)$$

Here, "a" denotes a function having a value getting smaller as a direction of a normal line of a feature point included in a three-dimensional model, and a direction of a normal line of a vertex included in a definite shaped model coincide with each other more. For example, "a" may be a value obtained by subtracting a square value of an inner product from a constant (e.g. a=(1−(inner product)2)). For example, the system 1 selects a similar definite shaped model by searching for "i" that minimizes "$A_i$".

Both of the distance and the normal lines may be considered for the evaluation of a degree of similarity. In this case, evaluation can be performed by the following formula.

[Math. 3]

$$F_i = w_0 D_i + w_1 A_i \quad (3)$$

Here, "$w_0$" and "$w_1$" denote weights. For example, the system 1 selects a similar definite shaped model by searching for "i" that minimizes "$F_i$".

In addition, a direction of gravitational force may be considered for the evaluation of a degree of similarity. For example, a degree of similarity may be evaluated by a degree of coincidence of directions of gravitational force between a three-dimensional model and a definite shaped model. For example, the system 1 allocates a definite shaped model such that a direction of gravitational force of a three-dimensional model (e.g. a direction of gravitational force of a real space) and a direction of gravitational force of a definite shaped model or a direction of gravitational force indicated by a grounding surface coincide with each other or substantially coincide with each other. It thereby becomes possible for the system 1 to perform such natural allocation that a bottom surface of a telephone device is brought into contact with a top surface of a table, for example.

After allocating a definite shaped model, the system 1 deletes, from a generation three-dimensional model, a three-dimensional model having a predetermined relationship with the allocated definite shaped model. For example, the system 1 deletes surrounding feature points of the allocated definite shaped model. This point will be described in detail with reference to FIGS. 12 and 13.

Figure 12:
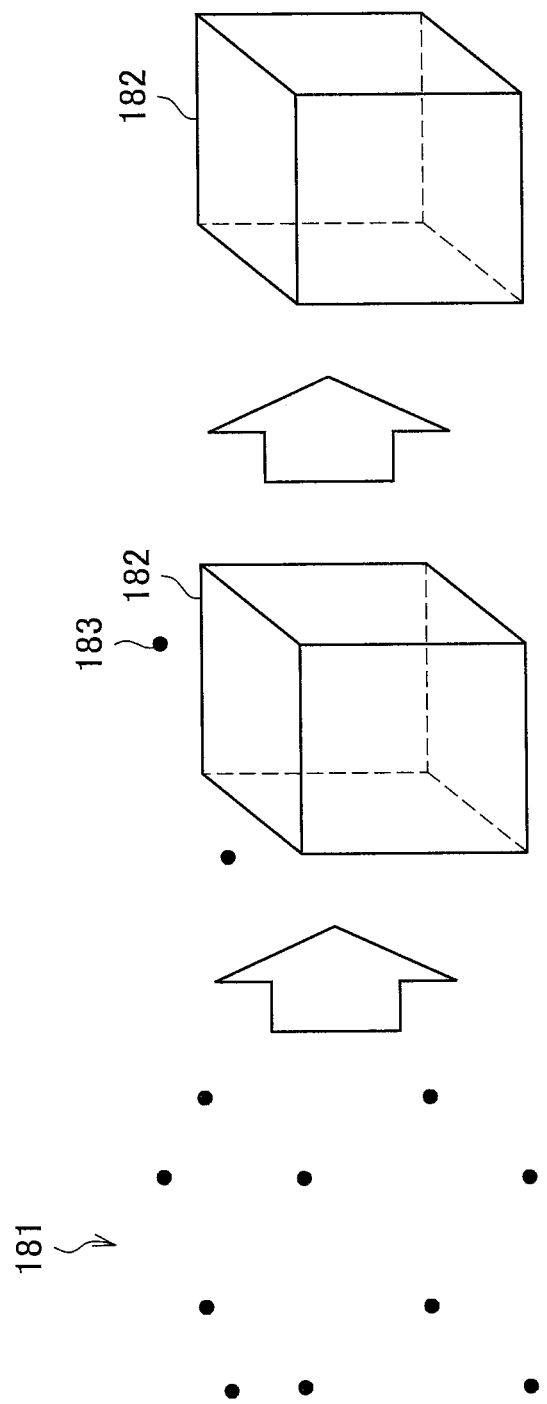
FIG. 12 is a diagram for describing allocation of a definite shaped model according to the present embodiment.

FIG. 12 is a diagram for describing allocation of a definite shaped model according to the present embodiment. FIG. 12 illustrates an example in which the above predetermined relationship is related to a distance. As illustrated in FIG. 12, the system 1 is assumed to generate a three-dimensional model 181 in the generation processing of a three-dimensional model. Subsequently, the system 1 allocates a cuboid definite shaped model 182 similar to the three-dimensional model 181, and deletes feature points of the three-dimensional model 181 that are included in the definite shaped model 182. In this case, a feature point 183 that is not included in the definite shaped model 182 remains. Then, the system 1 deletes the feature point 183 existing within a predetermined distance from the definite shaped model 182. By such processing, it becomes possible for the system 1 to delete a feature point to which a definite shaped model is not allocated. While such a feature point can be typically generated by an observation error, the system 1 can correct an error (hereinafter, also referred to as noise) of a three-dimensional model that is attributed to an observation error.

Figure 13:
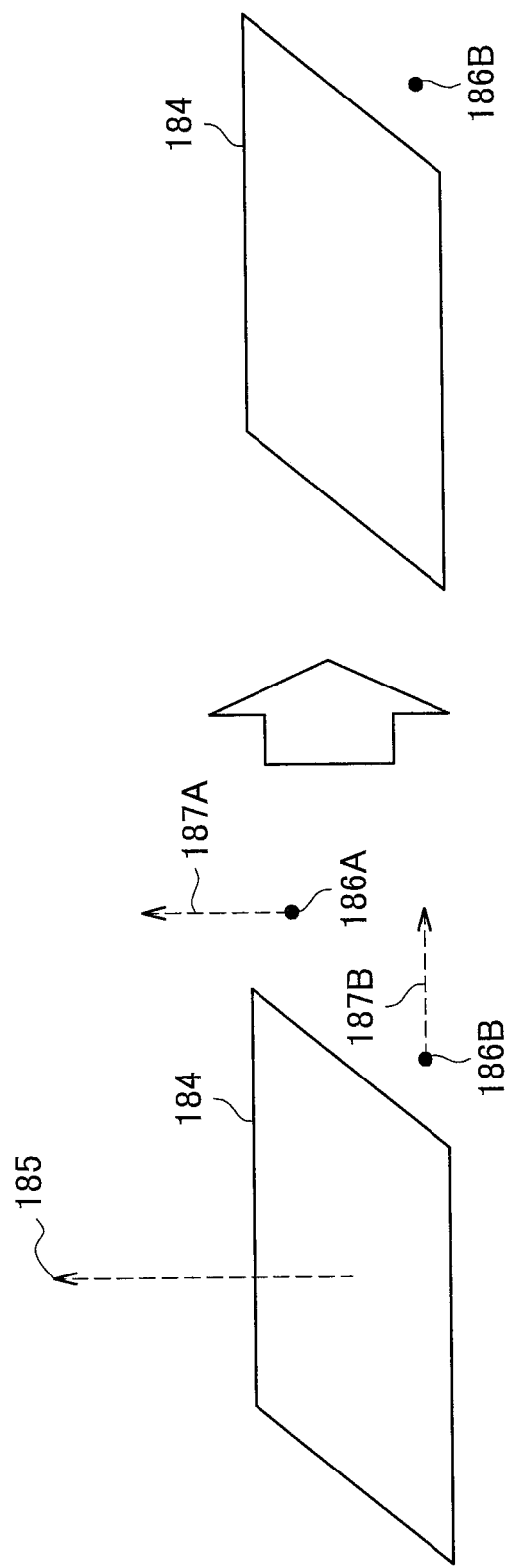
FIG. 13 is a diagram for describing allocation of a definite shaped model according to the present embodiment.

FIG. 13 is a diagram for describing allocation of a definite shaped model according to the present embodiment. FIG. 13 illustrates an example in which the above predetermined relationship is related to a distance and a normal line. As illustrated in FIG. 13, it is assumed that the system 1 allocates a flat surface definite shaped model 184, and feature points 186A and 186B that are not included in the definite shaped model 184 remain. Then, because a direction of a normal line 185 of the definite shaped model 184 and a direction of a normal line 187A of the feature point 186A coincide with each other or substantially coincide with each other, the system 1 deletes the feature point 186A. On the other hand, because the direction of the normal line 185 of the definite shaped model 184 and a direction of a normal line 187B of the feature point 186B are considerably different, the system 1 leaves the feature point 186B without deleting the feature point 186B. After that, another flat surface definite shaped model having a coinciding or substantially coinciding direction of a normal line can be allocated to the feature point 186B, By such processing, the system 1 can avoid erroneously deleting a feature point to which another definite shaped model can be allocated.

The allocation can be implemented at an arbitrary timing. For example, the allocation is implemented in accordance with a user instruction, the number of unallocated feature points, or an elapsed time or a moving distance of observation. In addition, allocation may be automatically performed, or may be performed in accordance with an allocation manipulation (reference numeral 152) performed by the user. The allocation manipulation performed by the user includes selection of a definite shaped model to be allocated, expansion and reduction, rotation, and designation of an allocation position. Hereinafter, an example of a UI to be displayed on the terminal apparatus 200 in a case where allocation is performed in accordance with a user manipulation will be described with reference to FIGS. 14 to 16. Note that a UI is assumed to transition from FIG. 14 to FIG. 16.

Figure 14:
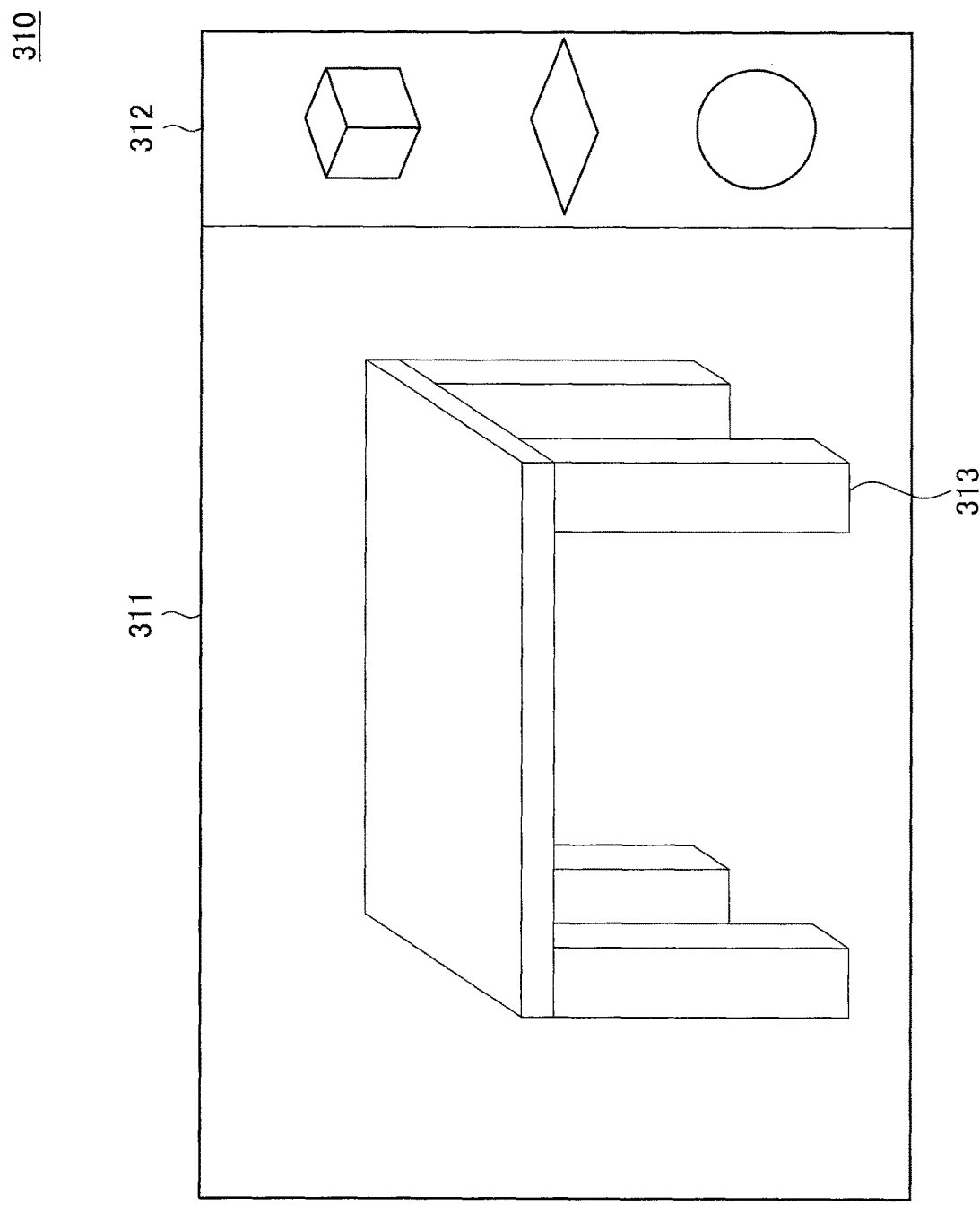
FIG. 14 is a diagram for describing an example of a according to the present embodiment.

FIG. 14 is a diagram for describing an example of a UI according to the present embodiment. A UI 310 includes a live-view image 311 and a definite shaped model selection window 312. As the live-view image 311, a table 313 is displayed. In addition, in the definite shaped model selection window, as allocation candidate definite shaped models, cuboid, flat surface, and spherical definite shaped models are displayed. These allocation candidates may be definite shaped models having a high degree of similarity described above. It is assumed that a three-dimensional model corresponding to the table 313 is generated by the generation processing of a three-dimensional model, and is matched with the table 313 included in the live-view image, on the basis of attitude information of the terminal apparatus 200, which is not explicitly displayed in the UI 310.

Figure 15:
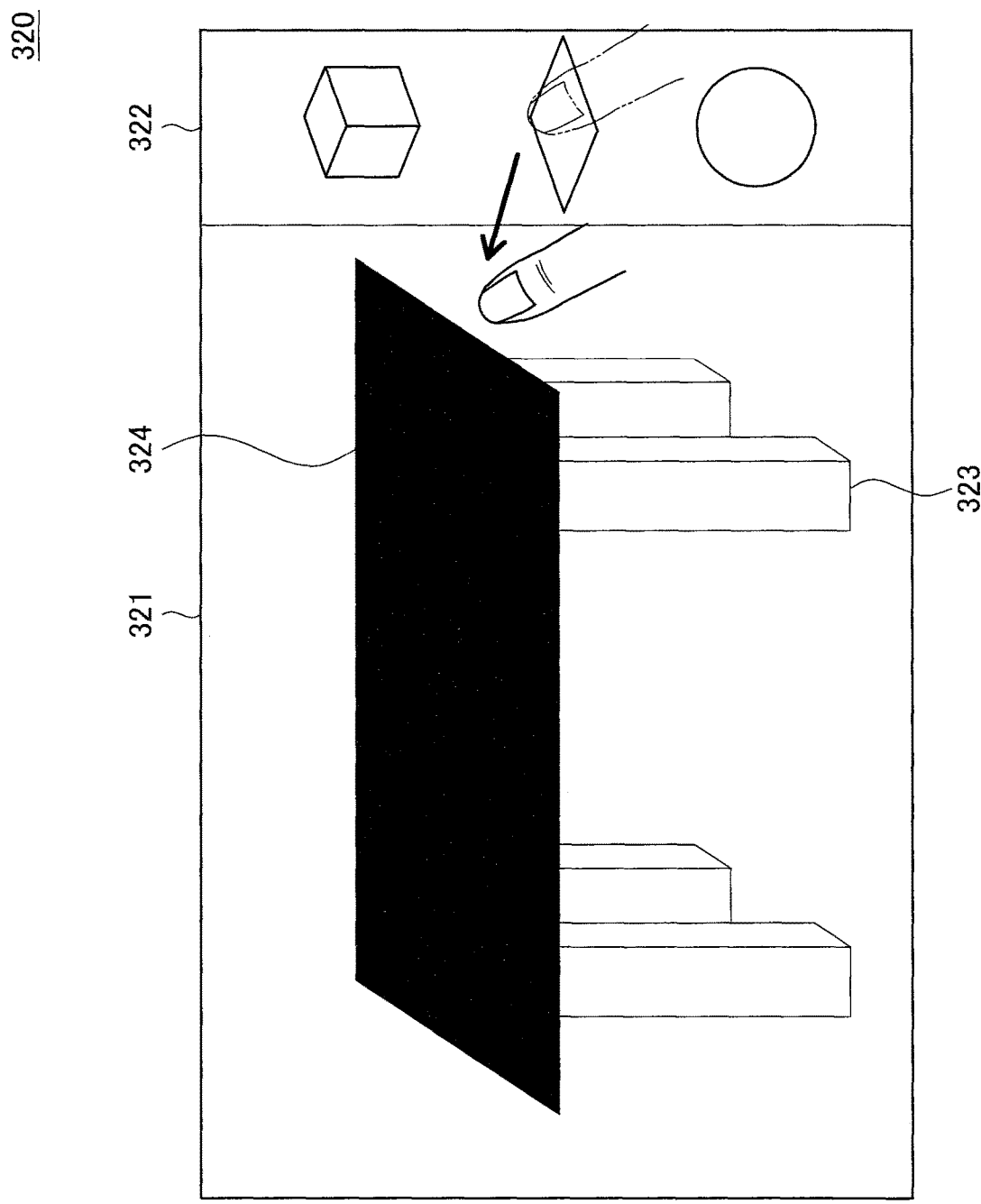
FIG. 15 is a diagram for describing an example of a UI according to the present embodiment.

FIG. 15 is a diagram for describing an example of a UI according to the present embodiment. A UI 320 is a UI to be displayed while an allocation manipulation is being performed by the user, and is a UI to be displayed after the UI 310. As illustrated in FIG. 15, the user performs allocation of a definite shaped model by performing drag-and-drop of a definite shaped model selected in a definite shaped model selection window 322, onto a real object included in a live-view image 321. In the example illustrated in FIG. 15, the user performs drag-and-drop of a flat surface definite shaped model 324 onto a top surface of a table 323. On the basis of this manipulation, the system 1 allocates a dragged-and-dropped flat surface definite shaped model 354 to a three-dimensional model corresponding to the top surface of the table 323.

Figure 16:
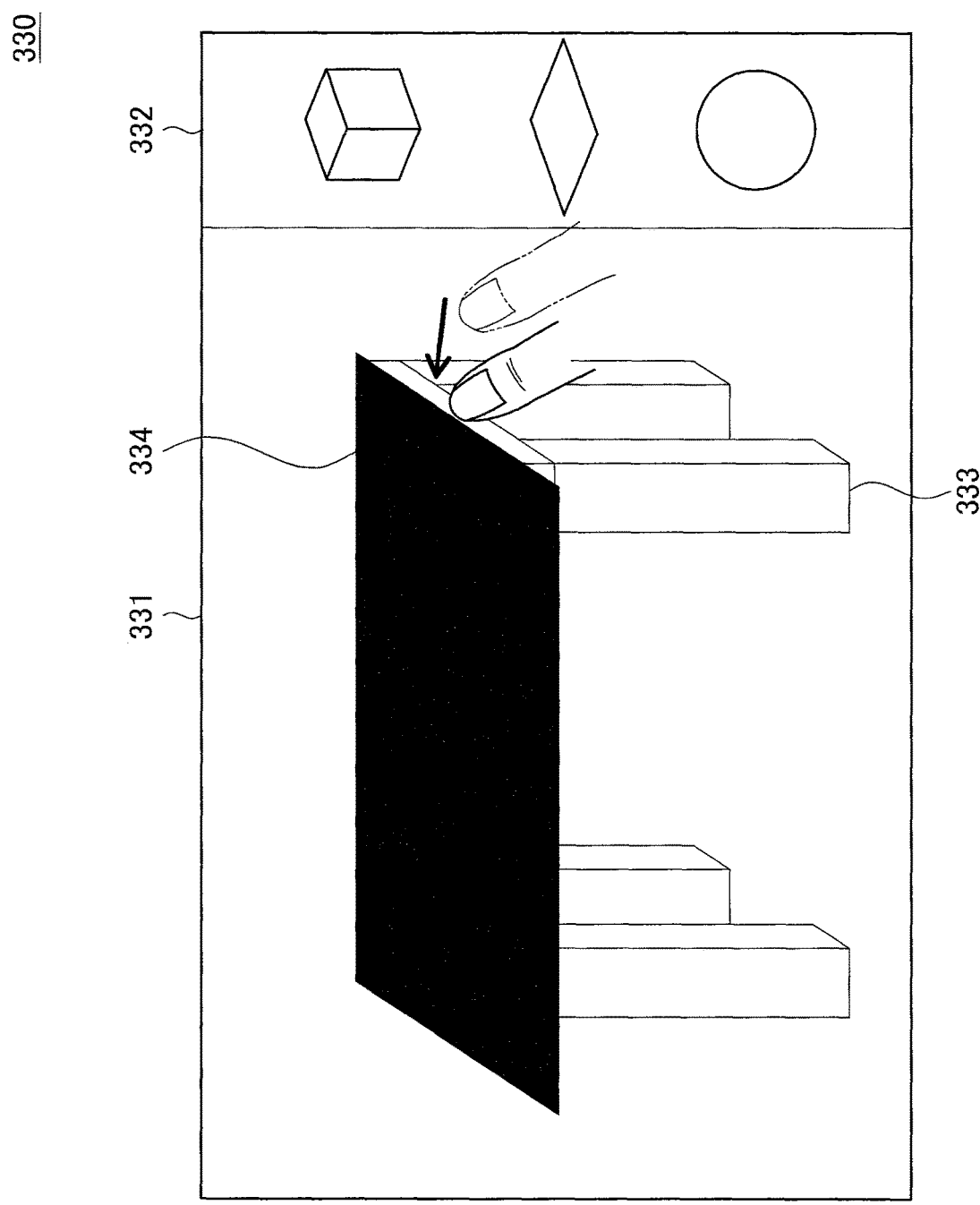
FIG. 16 is a diagram for describing an example of a UI according to the present embodiment.

FIG. 16 is a diagram for describing an example of a UI according to the present embodiment. A UI 330 is a UI to be displayed while an allocation manipulation is being performed by the user, and is a UI to be displayed after the 320. As illustrated in FIG. 16, the user reduces a definite shaped model 334 dragged-and-dropped from a definite shaped model selection window 332 into a live-view image 331, in accordance with a shape of a top surface of a table 333 being an allocation target real object. On the basis of this manipulation, the system 1 reduces the allocated definite shaped model. Aside from the expansion and reduction, the user may perform a change of an angle and the like.

Here, among unallocated three-dimensional models, a region to which it is difficult to allocate a definite shaped model is assumed to exist. In this case, the system 1 allocates a definite shaped model encompassing the region, and then, grants an Unknown flag to the definite shaped model. In this case, deletion of a feature point that is associated with the allocation of the definite shaped model needs not be implemented. Then, for example, along with additional observation, a new definite shaped model may be allocated in place of a definite shaped model to which an Unknown flag is granted.

Additionally, an unallocated three-dimensional model to which even a definite shaped model to which an Unknown flag is granted is not allocated may be deleted as noise. For example, feature points and the like that are scattering in a space can be deleted as noise.

<3.5. Output Control Processing>

The system 1 (e.g. the output control section 137 and the output section 220) outputs information.

For example, the system 1 (e.g. the output control section 137) estimates a surface of a generation three-dimensional model, and generates a polygon (reference numeral 147). Here, because a definite shaped model already has a surface, the system 1 estimates a surface obtained by connecting unallocated feature points included in a three-dimensional model, for example. Then, the system 1 (e.g. the output section 220) outputs the generation three-dimensional model (reference numeral 154). The generation three-dimensional model may be output as an image, or may be output as data.

In addition, the system 1 (e.g. the output control section 137) generates display control information for causing a UI that is based on a generation three-dimensional model updated/accumulated in the three-dimensional model DB, to be displayed (reference numeral 148). Then, the system 1 (e.g. the output section 220) outputs the UI on the basis of the generated display control information (reference numeral 155).

As a UI that is based on the generation three-dimensional model, the system 1 may display a virtual object corresponding to an allocated definite shaped model included in the generation three-dimensional model. For example, in a case where a virtual object is similar to the shape of a definite shaped model, it becomes possible for the system 1 to display a virtual object having a shape similar to the shape of a region in a real space that corresponds to an allocated definite shaped model.

Here, at the time of display of a virtual object, attitude information of the terminal apparatus 200 is considered. For example, in AR display processing, the system 1 performs matching between a real space and a three-dimensional model on the basis of attitude information of the terminal apparatus 200, and displays a virtual object at appropriate position and attitude in a live-view image. The same applies to VR and MR.

As a UI that is based on the generation three-dimensional model, the system 1 may display a virtual object corresponding to a portion of the generation three-dimensional model to which a definite shaped model is unallocated. For example, the system 1 may display a virtual object indicating a definite shaped model to which an Unknown flag is granted. In addition, the system 1 may control display of another virtual object on the basis of a relationship with a definite shaped model to which an Unknown flag is granted. Specifically, as for a virtual object existing on the rear side of a definite shaped model to which an Unknown flag is granted, the system 1 may perform transparent processing without invalidating drawing in occlusion representation.

As a UI that is based on the generation three-dimensional model, the system 1 may display information prompting the user to perform additional observation for making a generation three-dimensional model more detailed. For example, the system 1 may prompt the user to perform additional observation, by displaying a virtual object indicating a definite shaped model to which an Unknown flag is granted. This is because an unallocated portion can be typically generated due to insufficient observation or a complicated shape of a real object. Additionally, the system 1 may display information specifically instructing a position and an attitude of the terminal apparatus 200.

A UI that is based on the generation three-dimensional model may be a UI including AR, VR, or MR display, for example. Hereinafter, examples of UN will be described with reference to FIGS. 17 to 19.

Figure 17:
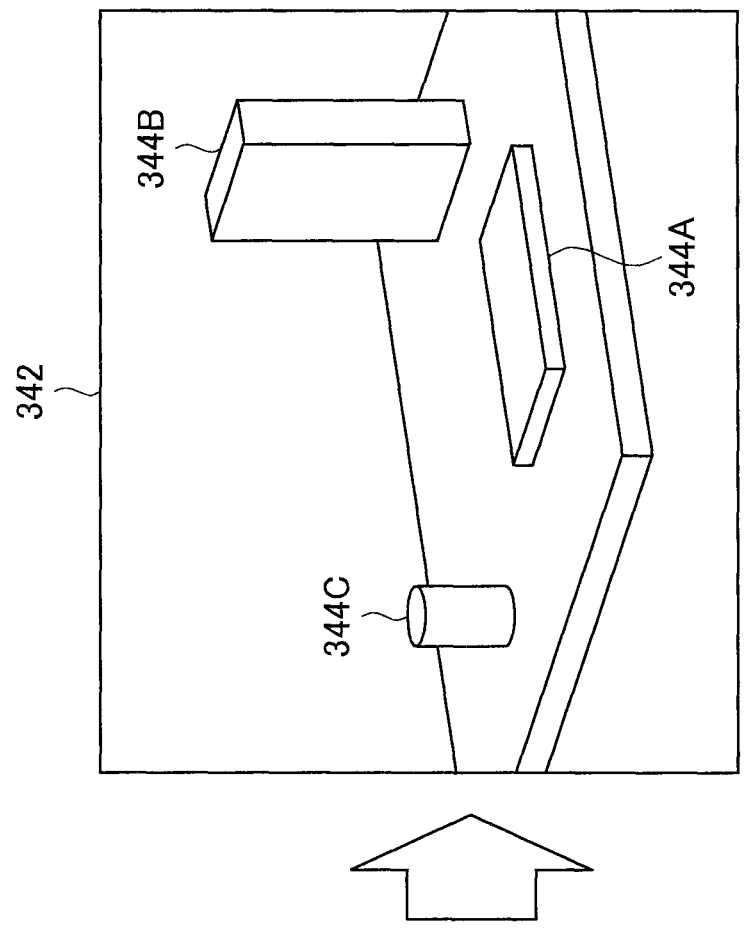
FIG. 17 is a diagram for describing an example of a UI according to the present embodiment.

FIG. 17 is a diagram for describing an example of a UI according to the present embodiment. A UI 341 is a UI illustrating a live-view image of a real space. A UI 342 is a UI in which a virtual object corresponding to an allocated definite shaped model in a generation three-dimensional model is displayed with being superimposed on the live-view image. For example, a cuboid virtual object 344A is superimposed on a keyboard 343A on a table, a cuboid virtual object 344B is superimposed on a casing 343B of a PC, and a cylindrical virtual object 344C is superimposed on a cup 343C. By such a it becomes possible for the user to recognize a generation status and an allocation status of a three-dimensional model.

FIG. 18 is a diagram for describing an example of a UI according to the present embodiment. A UI 351 is a UI illustrating a live-view image of a real space. A UI 352 is a UI in which a virtual object corresponding to an allocated definite shaped model in a generation three-dimensional model is displayed with being superimposed on the live-view image. In particular, in the UI 352, a virtual object 353 corresponding to a definite shaped model to which an Unknown flag is granted is superimpose-displayed transparently to a corresponding real object of a chair. By such a UI, the user can recognize a region for which allocation is not sufficient, and can perform additional observation. In other words, such a UI can be said to be a UI prompting the user to perform additional observation.

FIG. 19 is a diagram for describing an example of a UI according to the present embodiment. A UI 361 is a UI similar to the UI 342 illustrated in FIG. 17, and virtual objects 362A to 362C corresponding to allocated definite shaped models in a generation three-dimensional model are superimpose-displayed in a live-view image. A UI 363 is a UI obtained by further converting the virtual objects corresponding to the definite shaped models, into virtual objects having different shapes. For example, the cuboid virtual object 362A is converted into a grass virtual object 364A, the cuboid virtual object 362B is converted into a rock virtual object 364B, and a cylindrical virtual object is converted into a tree virtual object 364C. At the time of the conversion, a normal line direction of a definite shaped model is considered. In this manner, the system 1 can provide free representation irrespective of the shape of a real object in a real space.

<3.6. Flow of Processing>

Figure 20:
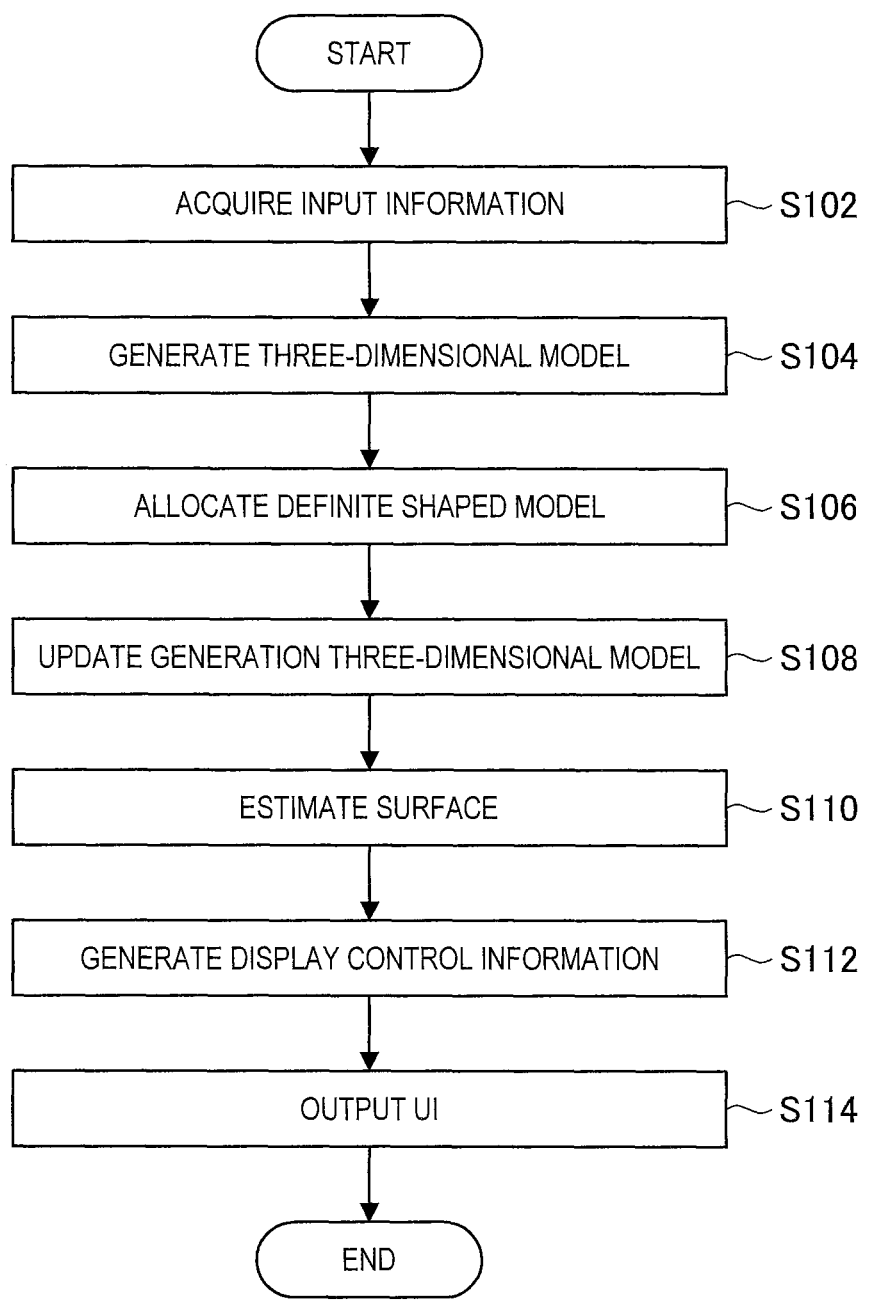
FIG. 20 is a flowchart illustrating an example of a flow of processing executed in the system according to the present embodiment.

Subsequently, an example of a flow of processing executed in the system 1 according to the present embodiment will be described with reference to FIG. 20. FIG. 20 is a flowchart illustrating an example of a flow of processing executed in the system 1 according to the present embodiment. Note that the registration processing of a definite shaped model is assumed to have been already executed before the processing illustrated in FIG. 20.

As illustrated in FIG. 20, first of all, the system 1 acquires input information (step S102), and generates a three-dimensional model (step S104). At this time, the system 1 generates a generation three-dimensional model by sequentially generating and accumulating three-dimensional models. Subsequently, the system 1 allocates a definite shaped model automatically or on the basis of a user manipulation (step S106), and updates the generation three-dimensional model (step S108). Here, the generation of a three-dimensional model and the allocation of a definite shaped model may be concurrently performed. Next, the system 1 generates a polygon by estimating a surface of the generation three-dimensional model (step S110), and generates display control information (step S112). Then, the system 1 outputs a UI on the basis of the generated display control information (step S114). In this UI, for example, a virtual object corresponding to an allocated definite shaped model included in the generation three-dimensional model is displayed.

In the above-described manner, the processing ends.

4. APPLICATION EXAMPLE

Subsequently, an example of application in which the present technology is used will be described.

(1) Data Construction for Preview System

The present technology can be used for prior preview of a real estate, an event site, or the like, for purchasing a property or making a rental contract. In this case, for example, by browsing via the internet or the like, or an AR/VR/MR system that uses a head-mounted display (HMD), a UI that is based on a generation three-dimensional model generated by the present technology is displayed.

For example, a data creator pre-registers, in a definite shaped model DB, definite shaped models such as a floor surface, a wall surface, a sofa, a chair, a desk, and a home electrical appliance, as real objects having a possibility of scattering in a property to be previewed. Then, the data creator observes the property to be previewed, causes a three-dimensional model to be generated, and updates the three-dimensional model by allocation of definite shaped models. At this time, it is possible to adjust the three-dimensional model in accordance with the intention of the data creator. For example, the data creator performs such adjustment that three-dimensional models corresponding to walls, a sofa, a chair, and a desk are left, and three-dimensional models corresponding to clothes, books, and goods that had been placed on the sofa are deleted. In this manner, a three-dimensional model for a preview system is generated.

In the case of transmitting a three-dimensional model of a property, latency is important, and it is desired to perform appropriate video presentation while avoiding excessively transmitting and receiving data. In this point, according to the present technology, because a three-dimensional model is efficiently represented, it becomes possible to suppress an amount of data to be transmitted and received, and achieve low latency. In addition, because it is possible to easily sort three-dimensional models by an allocated definite shaped model, it also becomes possible to selectively handle only three-dimensional models of portions desired to be previewed. In this case, it becomes possible to further suppress an amount of data to be transmitted and received, and achieve further lower latency.

Aside from the preview of properties, the present technology can also be used for generation of models for exhibition in internet shopping, modeling of a house for layout confirmation of pieces of furniture, or the like.

(2) Manufacturing Support

The present technology can also be used for supporting manufacturing.

For example, in recent years, as one of technologies for manufacturing, a 3D printer has attracted attention. For using a 3D printer, a design drawing (e.g. three-dimensional model) of an object to be printed is required. For generating the three-dimensional model, the present technology can be used.

For example, the user creates a rough shape using clay, causes a three-dimensional model to be generated, by observing the clay, and causes the three-dimensional model to be updated by the allocation of a definite shaped model. It thereby becomes possible for the user to cause a correct three-dimensional model to be generated, without creating a precise shape using clay. By performing a change of a definite shaped model to be allocated, fine adjustment, and the like, as subsequent processes, the user can also edit and complete an automatically-generated three-dimensional model intuitively and easily.

(3) Collision Avoidance Support

The present technology can be used for preventing collision between a user and an obstacle in a real space in a case where the user is moving round the real space in a VR/AR/MR application.

For example, the user preliminarily prepares a definite shaped model DB. Subsequently, the user causes a three-dimensional model to be generated, by observing a surrounding real space of the user, and causes the three-dimensional model to be updated by the allocation of a definite shaped model. At this time, complementing of an unobserved region by expansion of an allocated definite shaped model such as extending a flat surface, granting of an Unknown flag, deletion of noise, and the like are also performed. Next, an application sets a dangerous region corresponding to an obstacle. For example, the application may set, as a dangerous region, a definite shaped model to which an Unknown flag is granted. Furthermore, the application may set, as a dangerous region, all definite shaped models other than a flat surface allocated to a floor surface.

The application may display a virtual object prompting the user to avoid approaching the dangerous region. For example, the virtual object may be an implicit warning such as a big rock or a wall. Here, the type of the virtual object such as a big rock/small rock/wall can be changed in accordance with a shape and a size of a definite shaped model, magnitude of a degree of danger, and the like. In addition, the virtual object may be an explicit warning such as highlighting a boundary of the dangerous region. By such a virtual object, it becomes possible to preliminarily suppress approach of the user to an obstacle.

Figure 21:
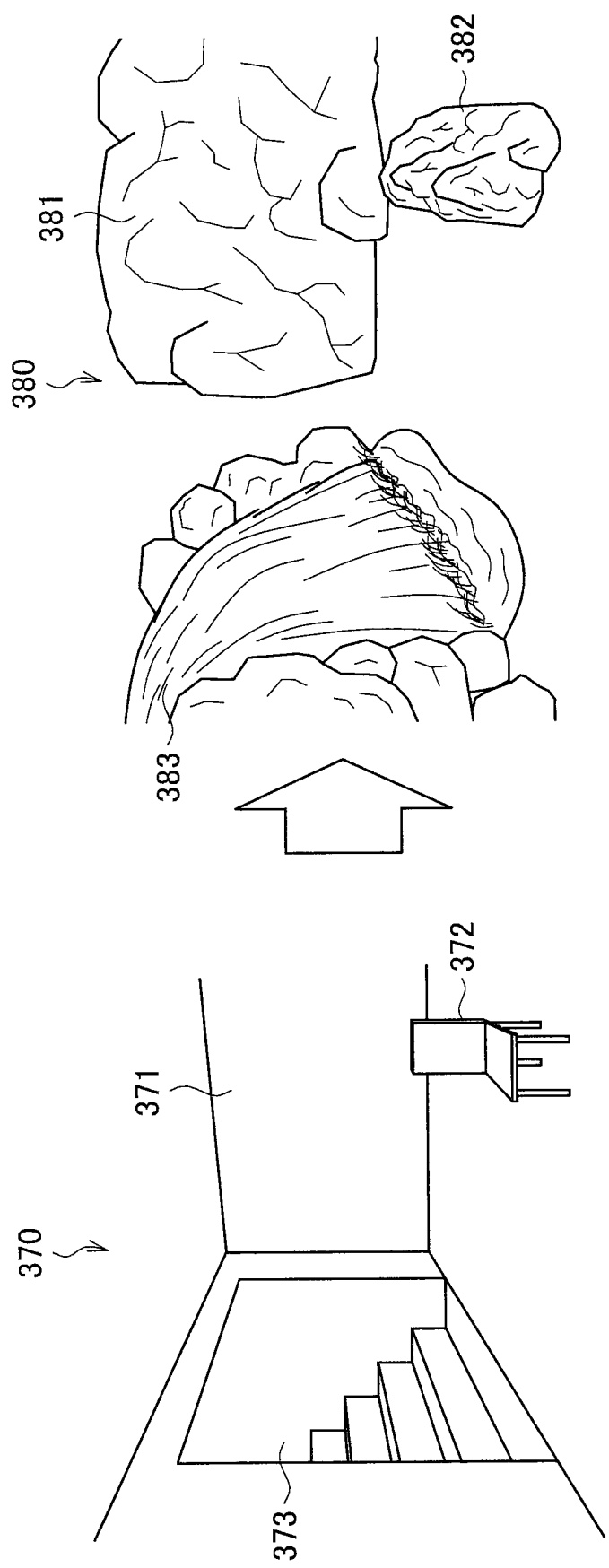
FIG. 21 is a diagram for describing an example of a UI according to the present embodiment.

An example of a UI in which a virtual object prompting the user to avoid approaching a dangerous region is displayed will be described with reference to FIG. 21. FIG. 21 is a diagram for describing an example of a UI according to the present embodiment. As illustrated in FIG. 21, it is assumed that a location 370 where the user uses an application is indoor, and a wall 371, a chair 372, and stairsteps 373 exist. In this case, the application displays a UI 380 including a rock wall virtual object 381 corresponding to the wall 371, a rock virtual object 382 corresponding to the chair 372, and a waterfall virtual object 383 corresponding to the stairsteps 373. By such display, the application promotes the user to avoid approaching the dangerous region.

Additionally, in a case where the user is approaching a dangerous region, the application may perform processing for emergency avoidance. For example, the application calculates a degree of emergency (e.g. a remaining time until collision) on the basis of a distance between the user and a dangerous region, and an approaching speed to the dangerous region, and performs processing corresponding to a degree of danger. Specifically, in a case where the degree of emergency is high (e.g. the remaining time is little), the application interrupts an application. In addition, in a case where the degree of emergency is medium, the application displays a message giving the user a warning against the approach to the dangerous region. In addition, in a case where the degree of emergency is low, the application guides the user to a safer location by displaying a virtual character or moving a target followed by the user, to another location.

Figure 22:
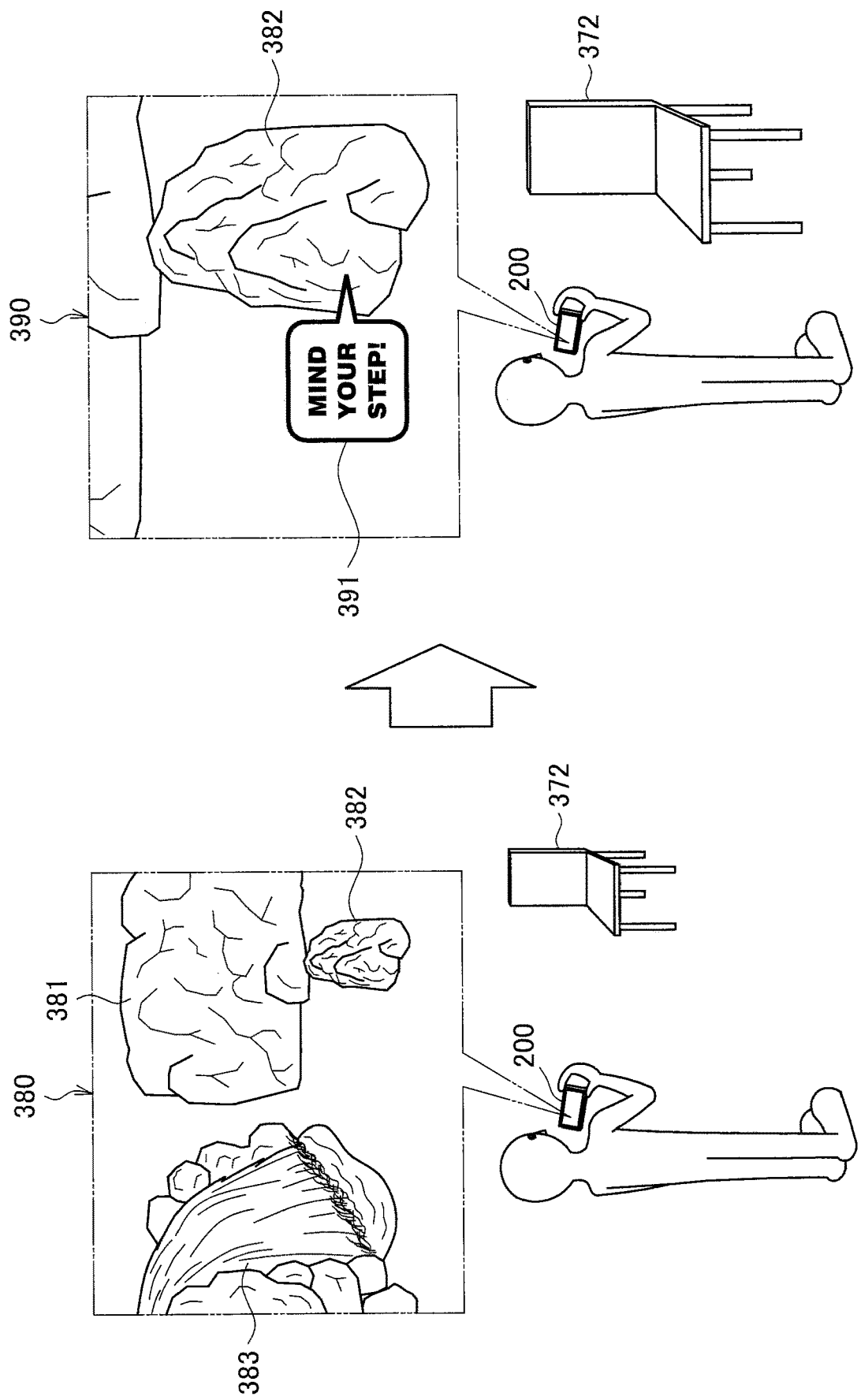
FIG. 22 is a diagram for describing an example of a UI according to the present embodiment.

An example of a UI in which a message giving the user a warning against the approach to a dangerous region is displayed will be described with reference to FIG. 22. FIG. 22 is a diagram for describing an example of a UI according to the present embodiment. As illustrated in FIG. 22, when the user approaches the chair 372 under a situation where the UI 380 is displayed, the terminal apparatus 200 displays a UI 390 including a warning message 391. By such display, the application gives the user a warning against the approach to the dangerous region.

By such display, it becomes possible for a VR/AR/MR application prevent collision between the user and an obstacle in a real space.

(4) Object Recognition

The present technology can be used for object recognition.

It is assumed that a real space is formed by a plurality of objects or regions, and the objects or regions have different attributes. According to the present technology, a three-dimensional model including one or more allocated definite shaped models is generated. Thus, it also becomes possible to set a region obtained by dividing the real space by each definite shaped model, as a recognition processing target region. The object recognition can be thereby performed highly accurately. In addition, a recognition processing target region may be set by combining a plurality of definite shaped models, and in this case, it becomes possible to perform scene recognition by a combination of a plurality of objects.

The definite shaped model-based divided recognition of a real space is also useful for self-position estimation, for example. Because the self-position estimation is a technology of estimating the position of itself in a quiescent environment, a moving object disturbs the estimation. Thus, by detecting a moving object on a definite shaped model basis, and deleting a portion corresponding to the moving object, from an environmental map in the SLAM, for example, it becomes possible to enhance accuracy of self-position estimation. Note that the detection of a moving object is performed by detection of a definite shaped model that performs a motion contradictory to a camera motion, for example.

5. HARDWARE CONFIGURATION EXAMPLE

Figure 23:
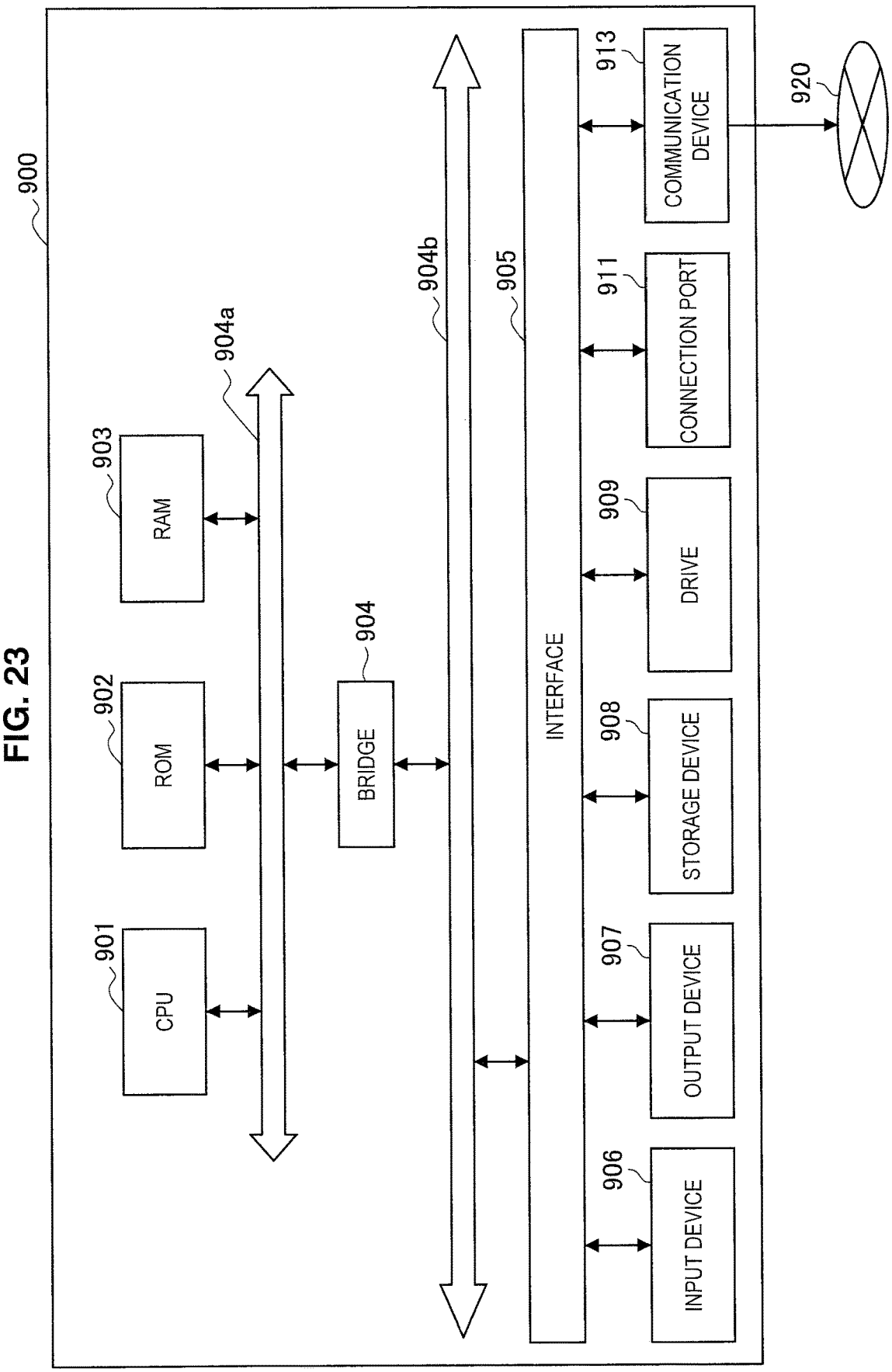
FIG. 23 is a block diagram illustrating an example of a hardware configuration of the information processing apparatus according to the present embodiment.

Finally, a hardware configuration of an information processing apparatus according to the present embodiment will be described with reference to FIG. 23. FIG. 23 is a block diagram illustrating an example of the hardware configuration of the information processing apparatus according to the present embodiment. Meanwhile, an information processing apparatus 900 illustrated in FIG. 23 may realize the information processing apparatus 100 or the terminal apparatus 200 illustrated respectively in FIGS. 5 and 6, for example. Information processing by the information processing apparatus 100 or the terminal apparatus 200 according to the present embodiment is realized according to cooperation between software and hardware described below.

As illustrated in FIG. 23, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. The CPU 901 can form the control section 130 illustrated in FIG. 5 or the control section 250 illustrated in FIG. 6, for example.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever. In addition, the input device 906 may be a remote control device using infrared ray or other electric waves or external connection equipment such as a mobile phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

In addition to the above, the input device 906 can be formed by a device that detects information related to the user. For example, the input device 906 can include various sensors such as an image sensor (a camera, for example), a depth sensor (a stereo camera, for example), an acceleration sensor, a gyro sensor, a geomagnetic sensor, an optical sensor, a sound sensor, a distance measurement sensor, and a force sensor. Also, the input device 906 may acquire information related to the state of the information processing apparatus 900 itself such as the posture and the moving velocity of the information processing apparatus 900 and information related to a surrounding environment of the information processing apparatus 900 such as brightness or noise around the information processing apparatus 900. Also, the input device 906 may include a GNSS module that receives a GNSS signal (a GPS signal from a global positioning system (GPS) satellite, for example) from a global navigation satellite system (GNSS) satellite and measures position information including the latitude, the longitude, and the altitude of the device. In addition, the input device 906 may detect the position through Wi-Fi (registered trademark), transmission and reception to and from a mobile phone, a PHS, a smartphone, or the like, near-field communication, or the like, in relation to the position information. The input device 906 can form the input section 210 illustrated in FIG. 6, for example.

The output device 907 is formed by a device that may visually or aurally notify the user of acquired information. As such devices, there is a display device such as a CRT display device, a liquid crystal display device, a plasma display device, an EL display device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals including reproduced sound data, audio data and the like into analog signals and aurally outputs the analog signals. The aforementioned output device 907 may form the output section 220 illustrated in FIG. 6, for example.

The storage device 908 is a device for data storage, formed as an example of a storage section of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like. The storage device 908 may form the storage section 120 illustrated in FIG. 5 or the storage section 240 illustrated in FIG. 6, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like. The communication device 913 may form the communication section 110 illustrated in FIG. 5 or the communication section 230 illustrated in FIG. 6, for example.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an Internet protocol-virtual private network (IP-VPN).

Hereinbefore, an example of a hardware configuration capable of realizing the functions of the information processing apparatus 900 according to the present embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

6. CONCLUSION

An embodiment of the present disclosure has been described in detail above with reference to FIGS. 1 to 23. As described above, the system 1 according to the present embodiment allocates, to a second three-dimensional model being at least a partial three-dimensional model included in a generated first three-dimensional model, a definite shaped model having a predetermined shape corresponding to the shape of the second three-dimensional model. According to the present technology, by the allocation of a definite shaped model, it becomes possible to generate, for a real object including an edge portion and a flat region, a three-dimensional model having a smooth surface, while maintaining a three-dimensional geometric structure. In other words, it becomes possible to bring a three-dimensional model closer to a real object. In addition, according to the present technology, by the allocation of a definite shaped model, because a stationary shape portion such as a flat surface or a curved surface can be represented by the definite shaped model, processing efficiency can be enhanced. In addition, according to the present technology, it becomes possible to efficiently represent a three-dimensional model including an enormous information amount, by degenerating the information amount.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that apparatuses described in this specification may be implemented as independent apparatuses, or a part or all thereof may be implemented as separate apparatuses. For example, the information processing apparatus 100 and the terminal apparatus 200 may be implemented as independent apparatuses.

Note that it is not necessary for the processing described in this specification with reference to the flowchart and the sequence diagram to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a control section configured to allocate, to a second three-dimensional model being at least a partial three-dimensional model included in a first three-dimensional model, a definite shaped model having a predetermined shape corresponding to a shape of the second three-dimensional model.

(2)

The information processing apparatus according to (1), including a storage section configured to store a plurality of the definite shaped models, in which the control section selects, from among the plurality of definite shaped models stored in the storage section, the definite shaped model to be allocated.

(3)

The information processing apparatus according to (2), in which the control section performs selection in accordance with a degree of similarity between the second three-dimensional model and the definite shaped model.

(4)

The information processing apparatus according to (3), in which the degree of similarity is evaluated by a distance between a feature point included in the second three-dimensional model, and a vertex included in the definite shaped model.

(5)

The information processing apparatus according to (3) or (4), in which the degree of similarity is evaluated by a degree of coincidence of normal lines between a feature point included in the second three-dimensional model, and a vertex included in the definite shaped model.

(6)

The information processing apparatus according to any one of (3) to (5), in which the degree of similarity is evaluated by a degree of coincidence of directions of gravitational force between the second three-dimensional model and the definite shaped model.

(7)

The information processing apparatus according to any one of (2) to (6), in which the control section performs selection in accordance with a user manipulation.

(8)

The information processing apparatus according to any one of (2) to (7), in which the control section deletes, from the first three-dimensional model, a three-dimensional model having a predetermined relationship with the allocated definite shaped model.

(9)

The information processing apparatus according to any one of (1) to (8), in which the control section generates display control information for causing a virtual object corresponding to the allocated definite shaped model included in the first three-dimensional model, to be displayed.

(10)

The information processing apparatus according to (9), in which the display control information includes information for causing the virtual object corresponding to a portion of the first three-dimensional model to which the definite shaped model is unallocated, to be displayed.

(11)

The information processing apparatus according to (9) or (10), in which the display control information includes information for causing information prompting a user to perform additional observation for making the first three-dimensional model more detailed, to be displayed.

(12)

The information processing apparatus according to any one of (9) to (11), in which the first three-dimensional model is a three-dimensional model of a surrounding real space of a user, and the display control information includes information for causing a virtual object prompting a user to avoid approaching the allocated definite shaped model included in the first three-dimensional model, to be displayed.

(13)

The information processing apparatus according to any one of (9) to (12), in which the first three-dimensional model is a three-dimensional model of a surrounding real space of a user, and the display control information includes information for causing information for giving a user a warning against approach to the allocated definite shaped model included in the first three-dimensional model, to be displayed.

(14)

The information processing apparatus according to any one of (1) to (13), in which the definite shaped model includes relative coordinates of a plurality of vertices, and information indicating a surface including the plurality of vertices.

(15)

The information processing apparatus according to (14), in which the definite shaped model includes at least any of information indicating texture of the surface, information indicating material, information indicating a normal line direction of the surface, or information indicating a grounding surface.

(16)

The information processing apparatus according to any one of (1) to which the three-dimensional model is a point cloud.

(17)

The information processing apparatus according to any one of (1) to (15), in which the three-dimensional model is a polygon.

(18)

The information processing apparatus according to any one of (1) to (17), in which the definite shaped model is a polygon.

(19)

An information processing method including:

allocating, by a processor, to a second three-dimensional model being at least a partial three-dimensional model included in a first three-dimensional model, a definite shaped model having a predetermined shape corresponding to a shape of the second three-dimensional model.

(20)

A storage medium having a program stored therein, the program causing a computer to function as:

a control section configured to allocate, to a second three-dimensional model being at least a partial three-dimensional model included in a first three-dimensional model, a definite shaped model having a predetermined shape corresponding to a shape of the second three-dimensional model.

REFERENCE SIGNS LIST 1 system
100 information processing apparatus
110 communication section
120 storage section
130 control section
131 registration section
133 acquisition section
135 allocation section
137 output control section
200 terminal apparatus
210 input section
220 output section
230 communication section
240 storage section
250 control section
251 estimation section
253 generation section

The invention claimed is:

1. An information processing apparatus comprising:
a control section configured to
acquire a first three-dimensional model generated based on observation information including at least one of captured image or depth information,
allocate, to each second three-dimensional model that is a partial three-dimensional model included in the first three-dimensional model, a definite shaped model having a predetermined shape corresponding to a shape of the second three-dimensional model, and
initiate display of a virtual object corresponding to each allocated second three-dimensional model having the predetermined shape superimposed on a corresponding portion of the first three-dimensional model,
wherein the first three-dimensional model is an integrated combination of a plurality of second three-dimensional models,
wherein the control section allocates the definite shaped model based on an allocation manipulation of a user, and
wherein the control section is implemented via at least one processor.

2. The information processing apparatus according to claim 1, further comprising:
a storage section configured to store a plurality of definite shaped models from which the control section selects the definite shaped model to be allocated,
wherein the storage section is implemented via at least one non-transitory computer-readable storage medium.

3. The information processing apparatus according to claim 2, wherein the control section performs selection in accordance with a degree of similarity between the second three-dimensional model and the definite shaped model.

4. The information processing apparatus according to claim 3, wherein the degree of similarity is evaluated by a distance between a feature point included in the second three-dimensional model, and a vertex included in the definite shaped model.

5. The information processing apparatus according to claim 3, wherein the degree of similarity is evaluated by a degree of coincidence of normal lines between a feature point included in the second three-dimensional model, and a vertex included in the definite shaped model.

6. The information processing apparatus according to claim 3, wherein the degree of similarity is evaluated by a degree of coincidence of directions of gravitational force between the second three-dimensional model and the definite shaped model.

7. The information processing apparatus according to claim 2, wherein the control section performs selection in accordance with a user manipulation.

8. The information processing apparatus according to claim 2, wherein the control section deletes, from the first three-dimensional model, a three-dimensional model having a predetermined relationship with the allocated definite shaped model.

9. The information processing apparatus according to claim 1, wherein the control section generates display control information for causing a virtual object corresponding to the allocated definite shaped model included in the first three-dimensional model, to be displayed.

10. The information processing apparatus according to claim 9, wherein the display control information includes information for causing the virtual object corresponding to a portion of the first three-dimensional model to which the definite shaped model is unallocated, to be displayed.

11. The information processing apparatus according to claim 9, wherein the display control information includes information for causing information prompting a user to perform additional observation for making the first three-dimensional model more detailed, to be displayed.

12. The information processing apparatus according to claim 9,
wherein the first three-dimensional model is a three-dimensional model of a surrounding real space of a user, and
the display control information includes information for causing a virtual object prompting a user to avoid approaching the allocated definite shaped model included in the first three-dimensional model, to be displayed.

13. The information processing apparatus according to claim 9,
wherein the first three-dimensional model is a three-dimensional model of a surrounding real space of a user, and
the display control information includes information for causing information for giving a user a warning against approach to the allocated definite shaped model included in the first three-dimensional model, to be displayed.

14. The information processing apparatus according to claim 1, wherein the definite shaped model includes relative coordinates of a plurality of vertices, and information indicating a surface including the plurality of vertices.

15. The information processing apparatus according to claim 14, wherein the definite shaped model includes at least any of information indicating texture of the surface, information indicating material, information indicating a normal line direction of the surface, or information indicating a grounding surface.

16. The information processing apparatus according to claim 1, wherein the three-dimensional model is a point cloud.

17. The information processing apparatus according to claim 1, wherein the three-dimensional model is a polygon.

18. The information processing apparatus according to claim 1, wherein the definite shaped model is a polygon.

19. An information processing method comprising:
acquiring, by a processor, a first three-dimensional model generated based on observation information including at least one of captured image or depth information;
allocating, by the processor, to each second three-dimensional model that is a partial three-dimensional model included in the first three-dimensional model, a definite shaped model having a predetermined shape corresponding to a shape of the second three-dimensional model; and
displaying a virtual object corresponding to each allocated second three-dimensional model having the predetermined shape superimposed on a corresponding portion of the first three-dimensional model,
wherein the first three-dimensional model is an integrated combination of a plurality of second three-dimensional models, and
wherein the definite shaped model is allocated based on an allocation manipulation of a user.

20. A non-transitory computer-readable storage medium having embodied thereon a program, which when executed by a computer causes the computer to execute a method, the method comprising:
acquiring a first three-dimensional model generated based on observation information including at least one of captured image or depth information;
allocating, to each second three-dimensional model that is a partial three-dimensional model included in the first three-dimensional model, a definite shaped model having a predetermined shape corresponding to a shape of the second three-dimensional model; and
displaying a virtual object corresponding to each allocated second three-dimensional model having the predetermined shape superimposed on a corresponding portion of the first three-dimensional model,
wherein the first three-dimensional model is an integrated combination of a plurality of second three-dimensional models, and
wherein the definite shaped model is allocated based on an allocation manipulation of a user.

* * * * *